US012707228B2

(12) United States Patent
Yen et al.

(10) Patent No.: US 12,707,228 B2
(45) **Date of Patent: *Aug. 11, 2026**

(54) GENERATING BINAURAL AUDIO IN RESPONSE TO MULTI-CHANNEL AUDIO USING AT LEAST ONE FEEDBACK DELAY NETWORK

(71) Applicant: DOLBY LABORATORIES LICENSING CORPORATION, San Francisco, CA (US)

(72) Inventors: Kuan-Chieh Yen, Foster City, CA (US); Dirk Jeroen Breebaart, Ultimo (AU); Grant A. Davidson, Burlingame, CA (US); Rhonda Wilson, San Francisco, CA (US); David M. Cooper, Carlton (AU); Zhiwei Shuang, Beijing (CN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/829,074

(22) Filed: Sep. 9, 2024

(65) Prior Publication Data

US 2025/0080943 A1 Mar. 6, 2025

Related U.S. Application Data

(63) Continuation of application No. 18/108,663, filed on Feb. 13, 2023, now Pat. No. 12,089,033, which is a (Continued)

(30) Foreign Application Priority Data

Apr. 29, 2014 (CN) ........................ 201410178258.0

(51) Int. Cl.

*H04S 7/00* (2006.01)
*G10L 19/008* (2013.01)
*H04S 3/00* (2006.01)

(52) U.S. Cl.

CPC ............ *H04S 7/306* (2013.01); *G10L 19/008* (2013.01); *H04S 3/004* (2013.01); *H04S 7/307* (2013.01);

(Continued)

(58) Field of Classification Search

None

See application file for complete search history.

(56) References Cited

U.S. PATENT DOCUMENTS 5,371,799 A 12/1994 Lowe et al.
7,903,824 B2 3/2011 Faller (Continued)

FOREIGN PATENT DOCUMENTS

CN 1655651 A 8/2005
CN 101366081 A 2/2009

(Continued)

OTHER PUBLICATIONS

Breebaart, J. et al."MPEG Surround Binaural Coding Proposal Philips/VAST Audio" MPEG Meeting ISO/IEC JTC1/SC29/WG11, Mar. 29, 2006.50 pages.

(Continued)

*Primary Examiner* — Duc Nguyen
*Assistant Examiner* — Assad Mohammed

(57) ABSTRACT

In some embodiments, virtualization methods for generating a binaural signal in response to channels of a multi-channel audio signal, which apply a binaural room impulse response (BRIR) to each channel including by using at least one feedback delay network (FDN) to apply a common late reverberation to a downmix of the channels. In some (Continued)

embodiments, input signal channels are processed in a first processing path to apply to each channel a direct response and early reflection portion of a single-channel BRIR for the channel, and the downmix of the channels is processed in a second processing path including at least one FDN which applies the common late reverberation. Typically, the common late reverberation emulates collective macro attributes of late reverberation portions of at least some of the single-channel BRIRs. Other aspects are headphone virtualizers configured to perform any embodiment of the method.

11 Claims, 10 Drawing Sheets

Related U.S. Application Data continuation of application No. 17/560,301, filed on Dec. 23, 2021, now Pat. No. 11,582,574, which is a continuation of application No. 17/012,076, filed on Sep. 4, 2020, now Pat. No. 11,212,638, which is a continuation of application No. 16/777,599, filed on Jan. 30, 2020, now Pat. No. 10,771,914, which is a continuation of application No. 16/541,079, filed on Aug. 14, 2019, now Pat. No. 10,555,109, which is a continuation of application No. 15/109,541, filed as application No. PCT/US2014/071100 on Dec. 18, 2014, now Pat. No. 10,425,763.

(60) Provisional application No. 61/988,617, filed on May 5, 2014, provisional application No. 61/923,579, filed on Jan. 3, 2014.

(52) U.S. Cl.
CPC ....... *H04S 2400/03* (2013.01); *H04S 2400/13* (2013.01); *H04S 2420/01* (2013.01)

(56) References Cited

U.S. PATENT DOCUMENTS

| | | | | |
|---|---|---|---|---|
| 8,265,284 | B2 | 9/2012 | Falck | |
| 8,515,104 | B2 | 8/2013 | Dickins | |
| 8,885,834 | B2 * | 11/2014 | Kuhr | H04S 7/304 381/61 |
| 2005/0053249 | A1 | 3/2005 | Wu | |
| 2005/0063551 | A1 * | 3/2005 | Cheng | H04S 5/005 381/19 |
| 2006/0233379 | A1 | 10/2006 | Lars | |
| 2008/0008342 | A1 | 1/2008 | Sauk | |
| 2008/0071549 | A1 | 3/2008 | Chong | |
| 2009/0103738 | A1 | 4/2009 | Faure | |
| 2009/0252356 | A1 * | 10/2009 | Goodwin | H04S 1/002 381/310 |
| 2010/0246832 | A1 | 9/2010 | Falck | |
| 2011/0135098 | A1 | 6/2011 | Kuhr | |
| 2011/0170721 | A1 | 7/2011 | Dickins | |
| 2011/0211702 | A1 | 9/2011 | Mundt | |
| 2011/0261966 | A1 | 10/2011 | Engdegard | |
| 2011/0317522 | A1 | 12/2011 | Florencio | |
| 2012/0082319 | A1 | 4/2012 | Jot | |
| 2012/0213375 | A1 | 8/2012 | Mahabub | |
| 2012/0263311 | A1 | 10/2012 | Neugebauer | |
| 2013/0202125 | A1 | 8/2013 | De Sena | |
| 2013/0216059 | A1 | 8/2013 | Yoo | |
| 2013/0272527 | A1 | 10/2013 | Oomen | |
| 2014/0270216 | A1 * | 9/2014 | Tsilfidis | H04R 3/002 381/66 |
| 2022/0182779 | A1 | 6/2022 | Yen | |

FOREIGN PATENT DOCUMENTS

| | | | | |
|---|---|---|---|---|
| CN | 101661746 | A | 3/2010 | |
| CN | 101843114 | A | 9/2010 | |
| CN | 101933344 | A | 12/2010 | |
| CN | 101960866 | A | 1/2011 | |
| CN | 101160619 | B | 9/2011 | |
| CN | 102187690 | A | 9/2011 | |
| CN | 102187691 | A | 9/2011 | |
| CN | 102667918 | A | 9/2012 | |
| CN | 103355001 | A | 10/2013 | |
| CN | 102172047 | B | 1/2014 | |
| EP | 1072089 | A1 | 1/2001 | |
| EP | 1794744 | A1 | 6/2007 | |
| EP | 2541542 | A1 | 1/2013 | |
| JP | 2007-336080 | A | 12/2007 | |
| JP | 2008527431 | A | 7/2008 | |
| JP | 2009-531906 | A | 9/2009 | |
| JP | 2009-543479 | A | 12/2009 | |
| JP | 2011529650 | A | 12/2011 | |
| JP | 2012-513138 | A | 6/2012 | |
| JP | 2013508760 | A | 3/2013 | |
| KR | 20070094723 | A | 9/2007 | |
| RU | 2383939 | C2 | 3/2010 | |
| RU | 2409911 | C2 | 1/2011 | |
| RU | 2409912 | C9 | 6/2011 | |
| RU | 2443075 | C2 | 2/2012 | |
| RU | 2011105972 | A | 8/2012 | |
| WO | 1999014983 | A1 | 3/1999 | |
| WO | 2008034221 | A1 | 3/2008 | |
| WO | 2010054360 | A1 | 5/2010 | |
| WO | WO-2012093352 | A1 * | 7/2012 | H04S 3/004 |
| WO | 2013111038 | A1 | 8/2013 | |
| WO | 2014111829 | A1 | 7/2014 | |

OTHER PUBLICATIONS

Choi, Daniel Dhaham "Auditory Virtual Environment with Dynamic Room Characteristics for Music Performances" Rensselaer Polytechnic Institute, Dissertations Publishing, 2013. 2 pages.

Faller, Christof "Parametric Multichannel Audio Coding Synthesis of Coherence Cues" IEEE Transactions on Audio, Speech and Language Processing, 12 pages.

Frenette, Jasmin "Reducing Artificial Reverberation Algorithm Requirements Using Time-Variant Feedback Delay Networks" University of Miami Thesis, 130 pages.

Hacihabiboglu, H. et al."Perception-Based Simplification for Binaural Room Auralisation", Proc. of the 12th International Conference on Auditory Display, London, UK, Jun. 20-23, 2006, 4 pages.

Jakka, Julia "Binaural to Multichannel Audio Upmix" Department of Electrical and Communications Engineering Laboratory of Acoustics and Audio Signal Processing, Jun. 2005. 59 pages.

Jot, Jean-Marc "Efficient Models for Reverberation and Distance Rendering in Computer Music and Virtual Audio Reality" Jun. 2005, Proc. Int. Computer Music Conf. pp. 236-243. 8 pages.

Jot, Jean-Marc et al "Digital Delay Networks for Designing Artificial Reverberators" Proc. of the 90th AES Convention, Feb. 19, 1991.18 pages.

Jot, Jean-Marc et al "Digital Signal Processing Issues in the Context of Binaural and Transaural Stereophony" Feb. 1995, presented at the 98th Convention, Audio Engineering Society, pp. 1-54. 54 pages.

Menzer, F. et al."Binaural Reverberation Using a Modified Jot Reverberator with Frequency-Dependent Interaural Coherence Matching" AES Convention, May 2009.6 pages.

Menzer, Fritz "Binaural Audio Signal Processing Using Interaural Coherence Matching" Ecole Polytechnique Federal de Lausanne Thesis No. 4643, 2010. 155 pages.

Menzer, Fritz "Binaural Reverberation Using Two-Parallel Feedback Delay Networks" AES 40th International Conference, Tokyo, Japan, Oct. 8-10, 2010, pp. 1-10. 10 pages.

(56) References Cited

OTHER PUBLICATIONS

Pallone, G. et al."Technical Description of the Orange Proposal for MPEG-H 3D Audio" MPEG Meeting ISO/IEC JTC1/SC29/WG11, Jul. 24, 2013. 14 pages.

* cited by examiner

GENERATING BINAURAL AUDIO IN RESPONSE TO MULTI-CHANNEL AUDIO USING AT LEAST ONE FEEDBACK DELAY NETWORK

CROSS-REFERENCE TO RELATED APPLICATIONS

This application is a continuation of U.S. patent application Ser. No. 18/108,663 filed Feb. 13, 2023, which is a continuation of U.S. patent application Ser. No. 17/560,301 filed Dec. 23, 2021, now U.S. Pat. No. 11,582,574, which is a continuation of U.S. patent application Ser. No. 17/012,076 filed Sep. 4, 2020, now U.S. Pat. No. 11,212,638, which is a continuation of U.S. patent application Ser. No. 16/777,599 filed Jan. 30, 2020, now U.S. Pat. No. 10,771,914, which is a continuation of U.S. patent application Ser. No. 16/541,079 filed Aug. 14, 2019, now U.S. Pat. No. 10,555,109, which is a continuation of U.S. patent application Ser. No. 15/109,541 filed Jul. 1, 2016, now U.S. Pat. No. 10,425,763, which is a U.S. national phase of PCT International Application No. PCT/US2014/071100 filed Dec. 18, 2014, which claims the benefit of priority to Chinese Patent Application No. 201410178258.0 filed 29 Apr. 2014; U.S. Provisional Patent Application No. 61/923,579 filed 3 Jan. 2014; and U.S. Provisional Patent Application No. 61/988,617 filed 5 May 2014, each of which is hereby incorporated by reference in its entirety.

BACKGROUND OF THE INVENTION

1. Field of the Invention

The invention relates to methods (sometimes referred to as headphone virtualization methods) and systems for generating a binaural signal in response to a multi-channel audio input signal, by applying a binaural room impulse response (BRIR) to each channel of a set of channels (e.g., to all channels) of the input signal. In some embodiments, at least one feedback delay network (FDN) applies a late reverberation portion of a downmix BRIR to a downmix of the channels.

2. Background of the Invention

Headphone virtualization (or binaural rendering) is a technology that aims to deliver a surround sound experience or immersive sound field using standard stereo headphones.

Early headphone virtualizers applied a head-related transfer function (HRTF) to convey spatial information in binaural rendering. A HRTF is a set of direction- and distance-dependent filter pairs that characterize how sound transmits from a specific point in space (sound source location) to both ears of a listener in an anechoic environment. Essential spatial cues such as the interaural time difference (ITD), interaural level difference (ILD), head shadowing effect, spectral peaks and notches due to shoulder and pinna reflections, can be perceived in the rendered HRTF-filtered binaural content. Due to the constraint of human head size, the HRTFs do not provide sufficient or robust cues regarding source distance beyond roughly one meter. As a result, virtualizers based solely on a HRTF usually do not achieve good externalization or perceived distance.

Most of the acoustic events in our daily life happen in reverberant environments where, in addition to the direct path (from source to ear) modeled by HRTF, audio signals also reach a listener's ears through various reflection paths.

Reflections introduce profound impact to auditory perception, such as distance, room size, and other attributes of the space.

To convey this information in binaural rendering, a virtualizer needs to apply the room reverberation in addition to the cues in the direct path HRTF. A binaural room impulse response (BRIR) characterizes the transformation of audio signals from a specific point in space to the listener's ears in a specific acoustic environment. In theory, BRIRs include all acoustic cues regarding spatial perception.

FIG. 1 is a block diagram of one type of conventional headphone virtualizer which is configured to apply a binaural room impulse response (BRIR) to each full frequency range channel ($X_1, \ldots, X_N$) of a multi-channel audio input signal. Each of channels $X_1, \ldots, X_N$, is a speaker channel corresponding to a different source direction relative to an assumed listener (i.e., the direction of a direct path from an assumed position of a corresponding speaker to the assumed listener position), and each such channel is convolved by the BRIR for the corresponding source direction. The acoustical pathway from each channel needs to be simulated for each ear. Therefore, in the remainder of this document, the term BRIR will refer to either one impulse response, or a pair of impulse responses associated with the left and right ears. Thus, subsystem 2 is configured to convolve channel $X_1$ with $BRIR_1$ (the BRIR for the corresponding source direction), subsystem 4 is configured to convolve channel $X_N$ with $BRIR_N$ (the BRIR for the corresponding source direction), and so on. The output of each BRIR subsystem (each of subsystems 2, . . . , 4) is a time-domain signal including a left channel and a right channel. The left channel outputs of the BRIR subsystems are mixed in addition element 6, and the right channel outputs of the BRIR subsystems are mixed in addition element 8. The output of element 6 is the left channel, L, of the binaural audio signal output from the virtualizer, and the output of element 8 is the right channel, R, of the binaural audio signal output from the virtualizer.

The multi-channel audio input signal may also include a low frequency effects (LFE) or subwoofer channel, identified in FIG. 1 as the "LFE" channel. In a conventional manner, the LFE channel is not convolved with a BRIR, but is instead attenuated in gain stage 5 of FIG. 1 (e.g., by −3 dB or more) and the output of gain stage 5 is mixed equally (by elements 6 and 8) into each of channel of the virtualizer's binaural output signal. An additional delay stage may be needed in the LFE path in order to time-align the output of stage 5 with the outputs of the BRIR subsystems (2, . . . , 4). Alternatively, the LFE channel may simply be ignored (i.e., not asserted to or processed by the virtualizer). For example, the FIG. 2 embodiment of the invention (to be described below) simply ignores any LFE channel of the multi-channel audio input signal processed thereby. Many consumer headphones are not capable of accurately reproducing an LFE channel.

In some conventional virtualizers, the input signal undergoes time domain-to-frequency domain transformation into the QMF (quadrature mirror filter) domain, to generate channels of QMF domain frequency components. These frequency components undergo filtering (e.g., in QMF-domain implementations of subsystems 2, . . . , 4 of FIG. 1) in the QMF domain and the resulting frequency components are typically then transformed back into the time domain (e.g., in a final stage of each of subsystems 2, . . . , 4 of FIG. 1) so that the virtualizer's audio output is a time-domain signal (e.g., time-domain binaural signal).

In general, each full frequency range channel of a multi-channel audio signal input to a headphone virtualizer is assumed to be indicative of audio content emitted from a sound source at a known location relative to the listener's ears. The headphone virtualizer is configured to apply a binaural room impulse response (BRIR) to each such channel of the input signal. Each BRIR can be decomposed into two portions: direct response and reflections. The direct response is the HRTF which corresponds to direction of arrival (DOA) of the sound source, adjusted with proper gain and delay due to distance (between sound source and listener), and optionally augmented with parallax effects for small distances.

The remaining portion of the BRIR models the reflections. Early reflections are usually primary or secondary reflections and have relatively sparse temporal distribution. The micro structure (e.g., ITD and ILD) of each primary or secondary reflection is important. For later reflections (sound reflected from more than two surfaces before being incident at the listener), the echo density increases with increasing number of reflections, and the micro attributes of individual reflections become hard to observe. For increasingly later reflections, the macro structure (e.g., the reverberation decay rate, interaural coherence, and spectral distribution of the overall reverberation) becomes more important. Because of this, the reflections can be further segmented into two parts: early reflections and late reverberations.

The delay of the direct response is the source distance from the listener divided by the speed of sound, and its level is (in absence of walls or large surfaces close to the source location) inversely proportional to the source distance. On the other hand, the delay and level of the late reverberations is generally insensitive to the source location. Due to practical considerations, virtualizers may choose to time-align the direct responses from sources with different distances, and/or compress their dynamic range. However, the temporal and level relationship among the direct response, early reflections, and late reverberation within a BRIR should be maintained.

The effective length of a typical BRIR extends to hundreds of milliseconds or longer in most acoustic environments. Direct application of BRIRs requires convolution with a filter of thousands of taps, which is computationally expensive. In addition, without parameterization, it would require a large memory space to store BRIRs for different source position in order to achieve sufficient spatial resolution. Last but not least, sound source locations may change over time, and/or the position and orientation of the listener may vary over time. Accurate simulation of such movement requires time-varying BRIR impulse responses. Proper interpolation and application of such time-varying filters can be challenging if the impulse responses of these filters have many taps.

A filter having the well-known filter structure known as a feedback delay network (FDN) can be used to implement a spatial reverberator which is configured to apply simulated reverberation to one or more channels of a multi-channel audio input signal. The structure of an FDN is simple. It comprises several reverb tanks (e.g., the reverb tank comprising gain element $g_1$ and delay line $z^{-n1}$, in the FDN of FIG. 4), each reverb tank having a delay and gain. In a typical implementation of an FDN, the outputs from all the reverb tanks are mixed by a unitary feedback matrix and the outputs of the matrix are fed back to and summed with the inputs to the reverb tanks. Gain adjustments may be made to the reverb tank outputs, and the reverb tank outputs (or gain adjusted versions of them) can be suitably remixed for multi-channel or binaural playback. Natural sounding reverberation can be generated and applied by an FDN with compact computational and memory footprints. FDNs have therefore been used in virtualizers to supplement the direct response produced by the HRTF.

For example, the commercially available Dolby Mobile headphone virtualizer includes a reverberator having FDN-based structure which is operable to apply reverb to each channel of a five-channel audio signal (having left-front, right-front, center, left-surround, and right-surround channels) and to filter each reverbed channel using a different filter pair of a set of five head related transfer function ("HRTF") filter pairs. The Dolby Mobile headphone virtualizer is also operable in response to a two-channel audio input signal, to generate a two-channel "reverbed" binaural audio output (a two-channel virtual surround sound output to which reverb has been applied). When the reverbed binaural output is rendered and reproduced by a pair of headphones, it is perceived at the listener's eardrums as HRTF-filtered, reverbed sound from five loudspeakers at left front, right front, center, left rear (surround), and right rear (surround) positions. The virtualizer upmixes a downmixed two-channel audio input (without using any spatial cue parameter received with the audio input) to generate five upmixed audio channels, applies reverb to the upmixed channels, and downmixes the five reverbed channel signals to generate the two-channel reverbed output of the virtualizer. The reverb for each upmixed channel is filtered in a different pair of HRTF filters.

In a virtualizer, an FDN can be configured to achieve certain reverberation decay time and echo density. However, the FDN lacks the flexibility to simulate the micro structure of the early reflections. Further, in conventional virtualizers the tuning and configuration of FDNs has mostly been heuristic.

Headphone virtualizers which do not simulate all reflection paths (early and late) cannot achieve effective externalization. The inventors have recognized that virtualizers which employ FDNs that try to simulate all reflection paths (early and late) usually have no more than limited success in simulating both early reflections and late reverberation and applying both to an audio signal. The inventors have also recognized that virtualizers which employ FDNs but do not have the capability to control properly spatial acoustic attributes such as reverb decay time, interaural coherence, and direct-to-late ratio, might achieve a degree of externalization but at the price of introducing excess timbral distortion and reverberation.

BRIEF DESCRIPTION OF THE INVENTION

In a first class of embodiments, the invention is a method for generating a binaural signal in response to a set of channels (e.g., each of the channels, or each of the full frequency range channels) of a multi-channel audio input signal, including steps of: (a) applying a binaural room impulse response (BRIR) to each channel of the set (e.g., by convolving each channel of the set with a BRIR corresponding to said channel), thereby generating filtered signals, including by using at least one feedback delay network (FDN) to apply a common late reverberation to a downmix (e.g., a monophonic downmix) of the channels of the set; and (b) combining the filtered signals to generate the binaural signal. Typically, a bank of FDNs is used to apply the common late reverberation to the downmix (e.g., with each FDN applying common late reverberation to a different frequency band). Typically, step (a) includes a step of applying to each channel of the set a "direct response and early reflection" portion of a single-channel BRIR for the channel, and the common late reverberation has been generated to emulate collective macro attributes of late reverberation portions of at least some (e.g., all) of the single-channel BRIRs.

A method for generating a binaural signal in response to a multi-channel audio input signal (or in response to a set of channels of such a signal) is sometimes referred to herein as a "headphone virtualization" method, and a system configured to perform such a method is sometimes referred to herein as a "headphone virtualizer" (or "headphone virtualization system" or "binaural virtualizer").

In typical embodiments in the first class, each of the FDNs is implemented in a filterbank domain (e.g., the hybrid complex quadrature mirror filter (HCQMF) domain or the quadrature mirror filter (QMF) domain, or another transform or subband domain which may include decimation), and in some such embodiments, frequency-dependent spatial acoustic attributes of the binaural signal are controlled by controlling the configuration of each FDN employed to apply late reverberation. Typically, a monophonic downmix of the channels is used as the input to the FDNs for efficient binaural rendering of audio content of the multi-channel signal. Typical embodiments in the first class include a step of adjusting FDN coefficients corresponding to frequency-dependent attributes (e.g., reverb decay time, interaural coherence, modal density, and direct-to-late ratio), for example, by asserting control values to the feedback delay network to set at least one of input gain, reverb tank gains, reverb tank delays, or output matrix parameters for each FDN. This enables better matching of acoustic environments and more natural sounding outputs.

In a second class of embodiments, the invention is a method for generating a binaural signal in response to a multi-channel audio input signal having channels, by applying a binaural room impulse response (BRIR) to each channel of a set of the channels of the input signal (e.g., each of the input signal's channels or each full frequency range channel of the input signal), including by: processing each channel of the set in a first processing path configured to model, and apply to said each channel, a direct response and early reflection portion of a single-channel BRIR for the channel; and processing a downmix (e.g., a monophonic (mono) downmix) of the channels of the set in a second processing path (in parallel with the first processing path) configured to model, and apply a common late reverberation to the downmix. Typically, the common late reverberation has been generated to emulate collective macro attributes of late reverberation portions of at least some (e.g., all) of the single-channel BRIRs. Typically, the second processing path includes at least one FDN (e.g., one FDN for each of multiple frequency bands). Typically, a mono downmix is used as the input to all reverb tanks of each FDN implemented by the second processing path.

Typically, mechanisms are provided for systematic control of macro attributes of each FDN in order to better simulate acoustic environments and produce more natural sounding binaural virtualization. Since most such macro attributes are frequency dependent, each FDN is typically implemented in the hybrid complex quadrature mirror filter (HCQMF) domain, the frequency domain, domain, or another filterbank domain, and a different or independent FDN is used for each frequency band. A primary benefit of implementing the FDNs in a filterbank domain is to allow application of reverb with frequency-dependent reverberation properties.

In various embodiments, the FDNs are implemented in any of a wide variety of filterbank domains, using any of a variety of filterbanks, including, but not limited to real or complex-valued quadrature mirror filters (QMF), finite-impulse response filters (FIR filters), infinite-impulse response filters (IIR filters), discrete Fourier transforms (DFTs), (modified) cosine or sine transforms, Wavelet transforms, or cross-over filters. In a preferred implementation, the employed filterbank or transform includes decimation (e.g., a decrease of the sampling rate of the frequency-domain signal representation) to reduce the computational complexity of the FDN process.

Some embodiments in the first class (and the second class) implement one or more of the following features:

1. a filterbank domain (e.g., hybrid complex quadrature mirror filter-domain) FDN implementation, or hybrid filterbank domain FDN implementation and time domain late reverberation filter implementation, which typically allows independent adjustment of parameters and/or settings of the FDN for each frequency band (which enables simple and flexible control of frequency-dependent acoustic attributes), for example, by providing the ability to vary reverb tank delays in different bands so as to change the modal density as a function of frequency;
2. The specific downmixing process, employed to generate (from the multi-channel input audio signal) the downmixed (e.g., monophonic downmixed) signal processed in the second processing path, depends on the source distance of each channel and the handling of direct response in order to maintain proper level and timing relationship between the direct and late responses;
3. An all-pass filter (APF) is applied in the second processing path (e.g., at the input or output of a bank of FDNs) to introduce phase diversity and increased echo density without changing the spectrum and/or timbre of the resulting reverberation;
4. Fractional delays are implemented in the feedback path of each FDN in a complex-valued, multi-rate structure to overcome issues related to delays quantized to the downsample-factor grid;
5. In the FDNs, the reverb tank outputs are linearly mixed directly into the binaural channels, using output mixing coefficients which are set based on the desired interaural coherence in each frequency band. Optionally, the mapping of reverb tanks to the binaural output channels is alternating across frequency bands to achieve balanced delay between the binaural channels. Also optionally, normalizing factors are applied to the reverb tank outputs to equalize their levels while conserving fractional delay and overall power;
6. Frequency-dependent reverb decay time and/or modal density is controlled by setting proper combinations of reverb tank delays and gains in each frequency band to simulate real rooms;
7. one scaling factor is applied per frequency band (e.g., at either the input or output of the relevant processing path), to:

control a frequency-dependent direct-to-late ratio (DLR) that matches that of a real room (a simple model may be used to compute the required scaling factor based on target DLR and reverb decay time, e.g., T60);

provide low-frequency attenuation to mitigate excess combing artifacts and/or low-frequency rumble; and/or apply diffuse field spectral shaping to the FDN responses;

8. Simple parametric models are implemented for controlling essential frequency-dependent attributes of the late reverberation, such as reverb decay time, interaural coherence, and/or direct-to-late ratio.

Aspects of the invention include methods and systems which perform (or are configured to perform, or support the performance of) binaural virtualization of audio signals (e.g., audio signals whose audio content consists of speaker channels, and/or object-based audio signals).

In another class of embodiments, the invention is a method and system for generating a binaural signal in response to a set of channels of a multi-channel audio input signal, including by applying a binaural room impulse response (BRIR) to each channel of the set, thereby generating filtered signals, including by using a single feedback delay network (FDN) to apply a common late reverberation to a downmix of the channels of the set; and combining the filtered signals to generate the binaural signal. The FDN is implemented in the time domain. In some such embodiments, the time-domain FDN includes:

- an input filter having an input coupled to receive the downmix, wherein the input filter is configured to generate a first filtered downmix in response to the downmix;
- an all-pass filter, coupled and configured to a second filtered downmix in response to the first filtered downmix;
- a reverb application subsystem, having a first output and a second output, wherein the reverb application subsystem comprises a set of reverb tanks, each of the reverb tanks having a different delay, and wherein the reverb application subsystem is coupled and configured to generate a first unmixed binaural channel and a second unmixed binaural channel in response to the second filtered downmix, to assert the first unmixed binaural channel at the first output, and to assert the second unmixed binaural channel at the second output; and
- an interaural cross-correlation coefficient (IACC) filtering and mixing stage coupled to the reverb application subsystem and configured to generate a first mixed binaural channel and a second mixed binaural channel in response to the first unmixed binaural channel and a second unmixed binaural channel.

The input filter may be implemented to generate (preferably as a cascade of two filters configured to generate) the first filtered downmix such that each BRIR has a direct-to-late ratio (DLR) which matches, at least substantially, a target DLR.

Each reverb tank may be configured to generate a delayed signal, and may include a reverb filter (e.g., implemented as a shelf filter or a cascade of shelf filters) coupled and configured to apply a gain to a signal propagating in said each of the reverb tanks, to cause the delayed signal to have a gain which matches, at least substantially, a target decayed gain for said delayed signal, in an effort to achieve a target reverb decay time characteristic (e.g., a $T_{60}$ characteristic) of each BRIR.

In some embodiments, the first unmixed binaural channel leads the second unmixed binaural channel, the reverb tanks include a first reverb tank configured to generate a first delayed signal having a shortest delay and a second reverb tank configured to generate a second delayed signal having a second-shortest delay, wherein the first reverb tank is configured to apply a first gain to the first delayed signal, the second reverb tank is configured to apply a second gain to the second delayed signal, the second gain is different than the first gain, the second gain is different than the first gain, and application of the first gain and the second gain results in attenuation of the first unmixed binaural channel relative to the second unmixed binaural channel. Typically, the first mixed binaural channel and the second mixed binaural channel are indicative of a re-centered stereo image. In some embodiments, the IACC filtering and mixing stage is configured to generate the first mixed binaural channel and the second mixed binaural channel such that said first mixed binaural channel and said second mixed binaural channel have an IACC characteristic which at least substantially matches a target IACC characteristic.

Typical embodiments of the invention provide a simple and unified framework for supporting both input audio consisting of speaker channels, and object-based input audio. In embodiments in which BRIRs are applied to input signal channels which are object channels, the "direct response and early reflection" processing performed on each object channel assumes a source direction indicated by metadata provided with the audio content of the object channel. In embodiments in which BRIRs are applied to input signal channels which are speaker channels, the "direct response and early reflection" processing performed on each speaker channel assumes a source direction which corresponds to the speaker channel (i.e., the direction of a direct path from an assumed position of a corresponding speaker to the assumed listener position). Regardless of whether the input channels are object or speaker channels, the "late reverberation" processing is performed on a downmix (e.g., a monophonic downmix) of the input channels and does not assume any specific source direction for the audio content of the downmix.

Other aspects of the invention are a headphone virtualizer configured (e.g., programmed) to perform any embodiment of the inventive method, a system (e.g., a stereo, multi-channel, or other decoder) including such a virtualizer, and a computer readable medium (e.g., a disc) which stores code for implementing any embodiment of the inventive method.

NOTATION AND NOMENCLATURE

Figure 1:
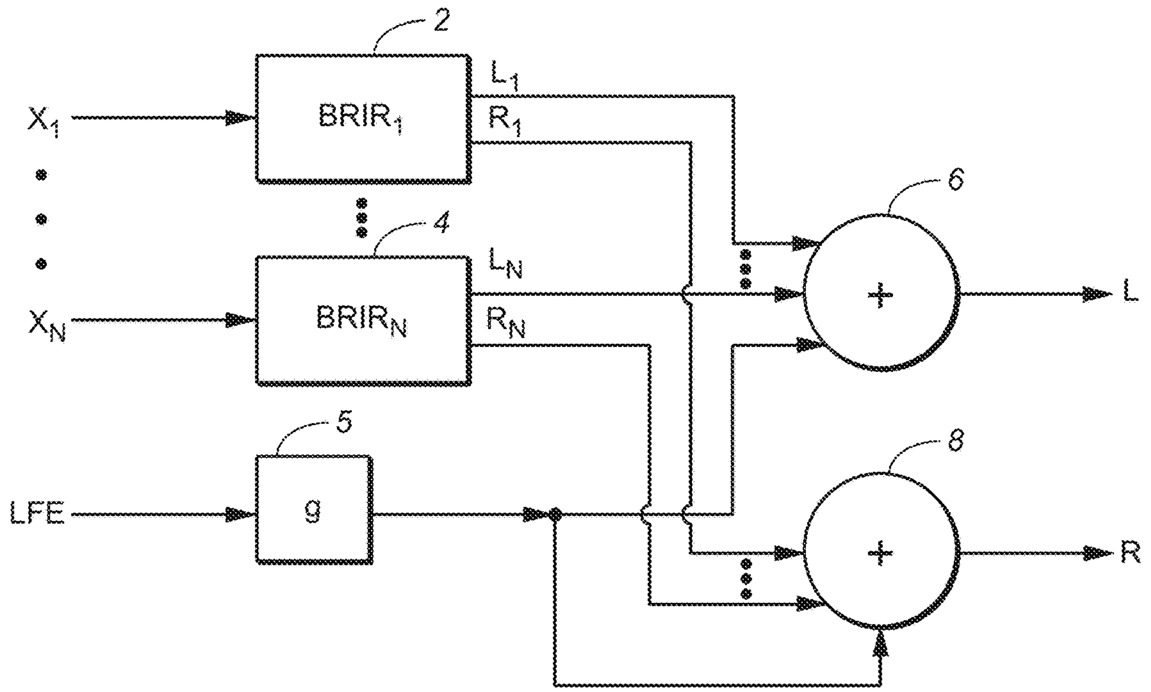
FIG. 1 (PRIOR ART)
FIG. 1 is a block diagram of a conventional headphone virtualization system.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a virtualizer may be referred to as a virtualizer system, and a system including such a subsystem (e.g., a system that generates X output signals in response to multiple inputs, in which the subsystem generates M of the inputs and the other X-M inputs are received from an external source) may also be referred to as a virtualizer system (or virtualizer).

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expression "analysis filterbank" is used in a broad sense to denote a system (e.g., a subsystem) configured to apply a transform (e.g., a time domain-to-frequency domain transform) on a time-domain signal to generate values (e.g., frequency components) indicative of content of the time-domain signal, in each of a set of frequency bands. Throughout this disclosure including in the claims, the expression "filterbank domain" is used in a broad sense to denote the domain of the frequency components generated by a transform or an analysis filterbank (e.g., the domain in which such frequency components are processed). Examples of filterbank domains include (but are not limited to) the frequency domain, the quadrature mirror filter (QMF) domain, and the hybrid complex quadrature mirror filter (HCQMF) domain. Examples of the transform which may be applied by an analysis filterbank include (but are not limited to) a discrete-cosine transform (DCT), modified discrete cosine transform (MDCT), discrete Fourier transform (DFT), and a wavelet transform. Examples of analysis filterbanks include (but are not limited to) quadrature mirror filters (QMF), finite-impulse response filters (FIR filters), infinite-impulse response filters (IIR filters), cross-over filters, and filters having other suitable multi-rate structures.

Throughout this disclosure including in the claims, the term "metadata" refers to separate and different data from corresponding audio data (audio content of a bitstream which also includes metadata). Metadata is associated with audio data, and indicates at least one feature or characteristic of the audio data (e.g., what type(s) of processing have already been performed, or should be performed, on the audio data, or the trajectory of an object indicated by the audio data). The association of the metadata with the audio data is time-synchronous. Thus, present (most recently received or updated) metadata may indicate that the corresponding audio data contemporaneously has an indicated feature and/or comprises the results of an indicated type of audio data processing.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Throughout this disclosure including in the claims, the following expressions have the following definitions:

- speaker and loudspeaker are used synonymously to denote any sound-emitting transducer. This definition includes loudspeakers implemented as multiple transducers (e.g., woofer and tweeter);
- speaker feed: an audio signal to be applied directly to a loudspeaker, or an audio signal that is to be applied to an amplifier and loudspeaker in series;
- channel (or "audio channel"): a monophonic audio signal. Such a signal can typically be rendered in such a way as to be equivalent to application of the signal directly to a loudspeaker at a desired or nominal position. The desired position can be static, as is typically the case with physical loudspeakers, or dynamic;
- audio program: a set of one or more audio channels (at least one speaker channel and/or at least one object channel) and optionally also associated metadata (e.g., metadata that describes a desired spatial audio presentation);

speaker channel (or "speaker-feed channel"): an audio channel that is associated with a named loudspeaker (at a desired or nominal position), or with a named speaker zone within a defined speaker configuration. A speaker channel is rendered in such a way as to be equivalent to application of the audio signal directly to the named loudspeaker (at the desired or nominal position) or to a speaker in the named speaker zone;

object channel: an audio channel indicative of sound emitted by an audio source (sometimes referred to as an audio "object"). Typically, an object channel determines a parametric audio source description (e.g., metadata indicative of the parametric audio source description is included in or provided with the object channel). The source description may determine sound emitted by the source (as a function of time), the apparent position (e.g., 3D spatial coordinates) of the source as a function of time, and optionally at least one additional parameter (e.g., apparent source size or width) characterizing the source;

object based audio program: an audio program comprising a set of one or more object channels (and optionally also comprising at least one speaker channel) and optionally also associated metadata (e.g., metadata indicative of a trajectory of an audio object which emits sound indicated by an object channel, or metadata otherwise indicative of a desired spatial audio presentation of sound indicated by an object channel, or metadata indicative of an identification of at least one audio object which is a source of sound indicated by an object channel); and render: the process of converting an audio program into one or more speaker feeds, or the process of converting an audio program into one or more speaker feeds and converting the speaker feed(s) to sound using one or more loudspeakers (in the latter case, the rendering is sometimes referred to herein as rendering "by" the loudspeaker(s)). An audio channel can be trivially rendered ("at" a desired position) by applying the signal directly to a physical loudspeaker at the desired position, or one or more audio channels can be rendered using one of a variety of virtualization techniques designed to be substantially equivalent (for the listener) to such trivial rendering. In this latter case, each audio channel may be converted to one or more speaker feeds to be applied to loudspeaker(s) in known locations, which are in general different from the desired position, such that sound emitted by the loudspeaker(s) in response to the feed(s) will be perceived as emitting from the desired position. Examples of such virtualization techniques include binaural rendering via headphones (e.g., using Dolby Headphone processing which simulates up to 7.1 channels of surround sound for the headphone wearer) and wave field synthesis.

The notation that a multi-channel audio signal is an "x.y" or "x.y.z" channel signal herein denotes that the signal has "x" full frequency speaker channels (corresponding to speakers nominally positioned in the horizontal plane of the assumed listener's ears), "y" LFE (or subwoofer) channels, and optionally also "z" full frequency overhead speaker channels (corresponding to speakers positioned above the assumed listener's head, e.g., at or near a room's ceiling).

The expression "IACC" herein denotes interaural cross-correlation coefficient in its usual sense, which is a measure of the difference between audio signal arrival times at a listener's ears, typically indicated by a number in a range from a first value indicating that the arriving signals are equal in magnitude and exactly out of phase, to an intermediate value indicating that the arriving signals have no similarity, to a maximum value indicating identical arriving signals having the same amplitude and phase.

Detailed Description of the Preferred Embodiments

Many embodiments of the present invention are technologically possible. It will be apparent to those of ordinary skill in the art from the present disclosure how to implement them. Embodiments of the inventive system and method will be described with reference to FIGS. 2-14.

Figure 2:
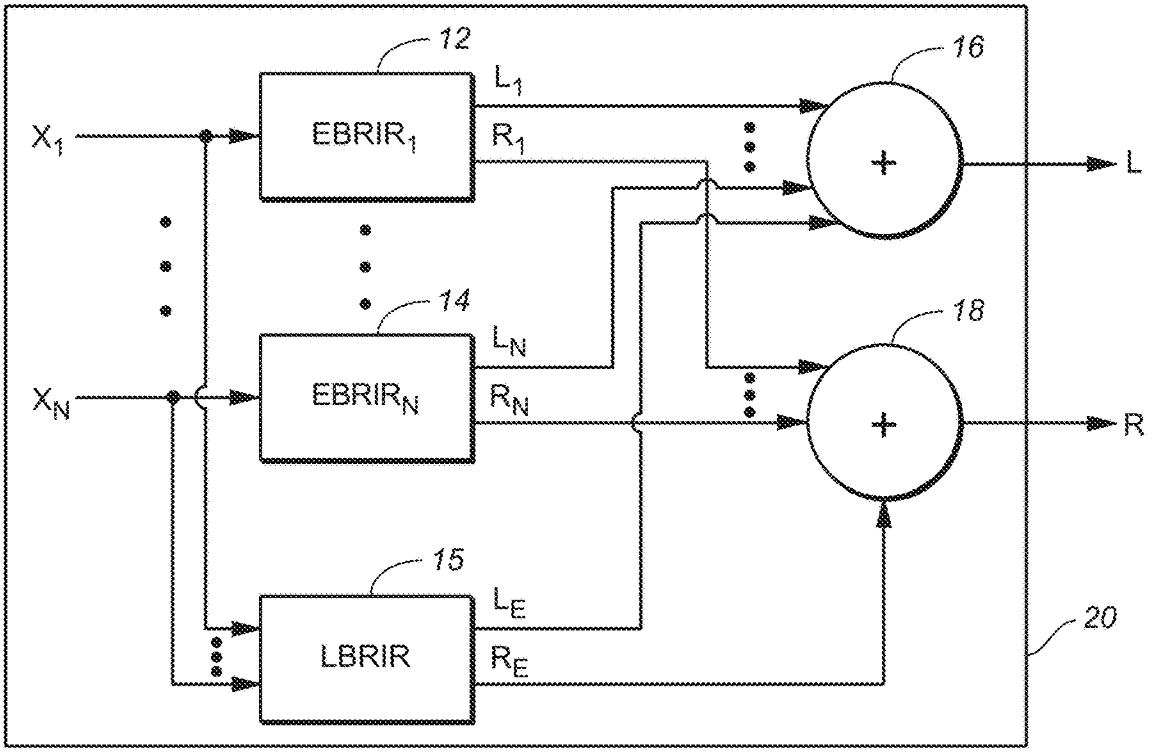
FIG. 2 is a block diagram of a system including an embodiment of the inventive headphone virtualization system.

FIG. 2 is a block diagram of a system (20) including an embodiment of the inventive headphone virtualization system. The headphone virtualization system (sometimes referred to as a virtualizer) is configured to apply a binaural room impulse response (BRIR) to N full frequency range channels ($X_1, \ldots, X_N$) of a multi-channel audio input signal. Each of channels $X_1, \ldots, X_N$, (which may be speaker channels or object channels) corresponds to a specific source direction and distance relative to an assumed listener, and the FIG. 2 system is configured to convolve each such channel by a BRIR for the corresponding source direction and distance.

System 20 may be a decoder which is coupled to receive an encoded audio program, and which includes a subsystem (not shown in FIG. 2) coupled and configured to decode the program including by recovering the N full frequency range channels ($X_1, \ldots, X_N$) therefrom and to provide them to elements 12, . . . , 14, and 15 of the virtualization system (which comprises elements, 12, . . . , 14, 15, 16, and 18, coupled as shown). The decoder may include additional subsystems, some of which perform functions not related to the virtualization function performed by the virtualization system, and some of which may perform functions related to the virtualization function. For example, the latter functions may include extraction of metadata from the encoded program, and provision of the metadata to a virtualization control subsystem which employs the metadata to control elements of the virtualizer system.

Subsystem 12 (with subsystem 15) is configured to convolve channel $X_1$ with $BRIR_1$ (the BRIR for the corresponding source direction and distance), subsystem 14 (with subsystem 15) is configured to convolve channel $X_N$ with $BRIR_N$ (the BRIR for the corresponding source direction), and so on for each of the N-2 other BRIR subsystems. The output of each of subsystems 12, . . . , 14, and 15 is a time-domain signal including a left channel and a right channel. Addition elements 16 and 18 are coupled to the outputs of elements 12, . . . , 14, and 15. Addition element 16 is configured to combine (mix) the left channel outputs of the BRIR subsystems, and addition element 18 is configured to combine (mix) the right channel outputs of the BRIR subsystems. The output of element 16 is the left channel, L, of the binaural audio signal output from the virtualizer of FIG. 2, and the output of element 18 is the right channel, R, of the binaural audio signal output from the virtualizer of FIG. 2.

Important features of typical embodiments of the invention are apparent from comparison of the FIG. 2 embodiment of the inventive headphone virtualizer with the conventional headphone virtualizer of FIG. 1. For purposes of the comparison, we assume that the FIG. 1 and FIG. 2 systems are configured so that, when the same multi-channel audio input signal is asserted to each of them, the systems apply a $BRIR_i$ having the same direct response and early reflection portion (i.e., the relevant $EBRIR_i$ of FIG. 2) to each full frequency range channel, $X_i$, of the input signal (although not necessarily with the same degree of success). Each $BRIR_i$ applied by the FIG. 1 or FIG. 2 system can be decomposed into two portions: a direct response and early reflection portion (e.g., one of the $EBIR_1$, . . . , $EBRIR_N$ portions applied by subsystems 12-14 of FIG. 2), and a late reverberation portion. The FIG. 2 embodiment (and other typical embodiments of the invention assume that late reverberation portions of the single-channel BRIRs, $BRIR_i$, can be shared across source directions and thus all channels, and thus apply the same late reverberation (i.e., a common late reverberation) to a downmix of all the full frequency range channels of the input signal. This downmix can be a monophonic (mono) downmix of all input channels, but may alternatively be a stereo or multi-channel downmix obtained from the input channels (e.g., from a subset of the input channels).

More specifically, subsystem 12 of FIG. 2 is configured to convolve input signal channel $X_1$ with $EBRIR_1$ (the direct response and early reflection BRIR portion for the corresponding source direction), subsystem 14 is configured to convolve channel $X_N$ with $EBRIR_N$ (the direct response and early reflection BRIR portion for the corresponding source direction), and so on. Late reverberation subsystem 15 of FIG. 2 is configured to generate a mono downmix of all the full frequency range channels of the input signal, and to convolve the downmix with LBRIR (a common late reverberation for all of the channels which are downmixed). The output of each BRIR subsystem of the FIG. 2 virtualizer (each of subsystems 12, . . . , 14, and 15) includes a left channel and a right channel (of a binaural signal generated from the corresponding speaker channel or downmix). The left channel outputs of the BRIR subsystems are combined (mixed) in addition element 16, and the right channel outputs of the BRIR subsystems are combined (mixed) in addition element 18.

Addition element 16 can be implemented to simply sum corresponding Left binaural channel samples (the Left channel outputs of subsystems 12, . . . , 14, and 15) to generate the Left channel of the binaural output signal, assuming that appropriate level adjustments and time alignments are implemented in the subsystems 12, . . . , 14, and 15. Similarly, addition element 18 can also be implemented to simply sum corresponding Right binaural channel samples (e.g., the Right channel outputs of subsystems 12, . . . , 14, and 15) to generate the Right channel of the binaural output signal, again assuming that appropriate level adjustments and time alignments are implemented in the subsystems 12, . . . , 14, and 15.

Subsystem 15 of FIG. 2 can be implemented in any of a variety of ways, but typically includes at least one feedback delay network configured to apply the common late reverberation to a monophonic downmix of the input signal channels asserted thereto. Typically, where each of subsystems 12, . . . , 14 applies a direct response and early reflection portion ($EBRIR_i$) of a single-channel BRIR for the channel ($X_i$) it processes, the common late reverberation has been generated to emulate collective macro attributes of late reverberation portions of at least some (e.g., all) of the single-channel BRIRs (whose "direct response and early reflection portions" are applied by subsystems 12, . . . , 14). For example, one implementation of subsystem 15 has the same structure as subsystem 200 of FIG. 3, which includes a bank of feedback delay networks (203, 204, . . . , 205) configured to apply a common late reverberation to a monophonic downmix of the input signal channels asserted thereto.

Subsystems 12, . . . , 14 of FIG. 2 can be implemented in any of a variety of ways (in either the time domain or a filterbank domain), with the preferred implementation for any specific application depending on various considerations, such as (for example) performance, computation, and memory. In one exemplary implementation, each of subsystems 12, . . . , 14 is configured to convolve the channel asserted thereto with a FIR filter corresponding to the direct and early responses associated with the channel, with gain and delay properly set so that the outputs of the subsystems 12, . . . , 14 may be simply and efficiently combined with those of subsystem 15.

Figure 3:
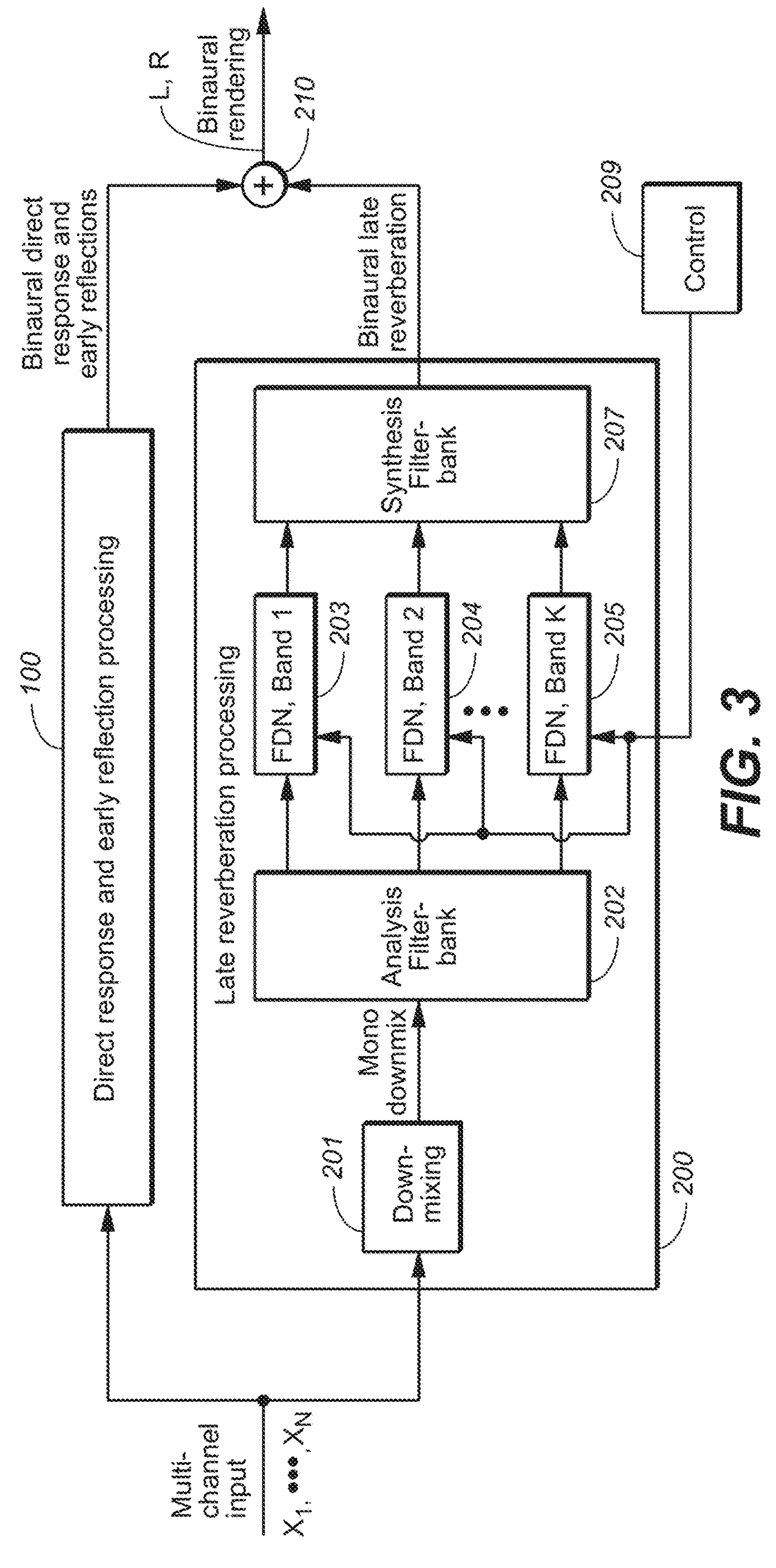
FIG. 3 is a block diagram of another embodiment of the inventive headphone virtualization system.

FIG. 3 is a block diagram of another embodiment of the inventive headphone virtualization system. The FIG. 3 embodiment is similar to that of FIG. 2, with two (left and right channel) time domain signals being output from direct response and early reflection processing subsystem 100, and two (left and right channel) time domain signals being output from late reverberation processing subsystem 200. Addition element 210 is coupled to the outputs of subsystems 100 and 200. Element 210 is configured to combine (mix) the left channel outputs of subsystems 100 and 200 to generate the left channel, L, of the binaural audio signal output from the FIG. 3 virtualizer, and to combine (mix) the right channel outputs of subsystems 100 and 200 to generate the right channel, R, of the binaural audio signal output from the FIG. 3 virtualizer. Element 210 can be implemented to simply sum corresponding left channel samples output from subsystems 100 and 200 to generate the left channel of the binaural output signal, and to simply sum corresponding right channel samples output from subsystems 100 and 200 to generate the right channel of the binaural output signal, assuming that appropriate level adjustments and time alignments are implemented in the subsystems 100 and 200.

In the FIG. 3 system, the channels, $X_i$, of the multi-channel audio input signal are directed to, and undergo processing in, two parallel processing paths: one through direct response and early reflection processing subsystem 100; the other through late reverberation processing subsystem 200. The FIG. 3 system is configured to apply a $BRIR_i$ to each channel, $X_i$. Each $BRIR_i$ can be decomposed into two portions: a direct response and early reflection portion (applied by subsystem 100), and a late reverberation portion (applied by subsystem 200). In operation, direct response and early reflection processing subsystem 100 thus generates the direct response and the early reflections portions of the binaural audio signal which is output from the virtualizer, and late reverberation processing subsystem ("late reverberation generator") 200 thus generates the late reverberation portion of the binaural audio signal which is output from the virtualizer. The outputs of subsystems 100 and 200 are mixed (by addition subsystem 210) to generate the binaural audio signal, which is typically asserted from subsystem 210 to a rendering system (not shown) in which it undergoes binaural rendering for playback by headphones.

Typically, when rendered and reproduced by a pair of headphones, a typical binaural audio signal output from element 210 is perceived at the listener's eardrums as sound from "N" loudspeakers (where $N \geq 2$ and N is typically equal to 2, 5 or 7) at any of a wide variety of positions, including positions in front of, behind, and above the listener. Reproduction of output signals generated in operation of the FIG. 3 system can give the listener the experience of sound that comes from more than two (e.g., five or seven) "surround" sources. At least some of these sources are virtual.

Direct response and early reflection processing subsystem 100 can be implemented in any of a variety of ways (in either the time domain or a filterbank domain), with the preferred implementation for any specific application depending on various considerations, such as (for example) performance, computation, and memory. In one exemplary implementation, subsystem 100 is configured to convolve each channel asserted thereto with a FIR filter corresponding to the direct and early responses associated with the channel, with gain and delay properly set so that the outputs of subsystems 100 may be simply and efficiently combined (in element 210) with those of subsystem 200.

As shown in FIG. 3, late reverberation generator 200 includes downmixing subsystem 201, analysis filterbank 202, a bank of FDNs (FDNs 203, 204, . . . , and 205), and synthesis filterbank 207, coupled as shown. Subsystem 201 is configured to downmix the channels of the multi-channel input signal into a mono downmix, and analysis filterbank 202 is configured to apply a transform to the mono downmix to split the mono downmix into "K" frequency bands, where K is an integer. The filterbank domain values (output from filterbank 202) in each different frequency band are asserted to a different one of the FDNs 203, 204, . . . , 205 (there are "K" of these FDNs, each coupled and configured to apply a late reverberation portion of a BRIR to the filterbank domain values asserted thereto). The filterbank domain values are preferably decimated in time to reduce the computational complexity of the FDNs.

In principle, each input channel (to subsystem 100 and subsystem 201 of FIG. 3) can be processed in its own FDN (or bank of FDNs) to simulate the late reverberation portion of its BRIR. Despite the fact that the late-reverberation portion of BRIRs associated with different sound source locations are typically very different in terms of root-mean square differences in the impulse responses, their statistical attributes such as their average power spectrum, their energy decay structure, the modal density, peak density and alike are often very similar. Therefore, the late reverberation portion of a set of BRIRs is typically perceptually quite similar across channels and consequently, it is possible to use one common FDN or bank of FDNs (e.g., FDNs 203, 204, . . . , 205) to simulate the late-reverberation portion of two or more BRIRs. In typical embodiments, one such common FDN (or bank of FDNs) is employed, and the input thereto is comprised of one or more downmixes constructed from the input channels. In the exemplary implementation of FIG. 2, the downmix is a monophonic downmix (asserted at the output of subsystem 201) of all input channels.

With reference to the FIG. 2 embodiment, each of the FDNs 203, 204, . . . , and 205, is implemented in the filterbank domain, and is coupled and configured to process a different frequency band of the values output from analysis filterbank 202, to generate left and right reverbed signals for each band. For each band, the left reverbed signal is a sequence of filterbank domain values, and right reverbed signal is another sequence of filterbank domain values. Synthesis filterbank 207 is coupled and configured to apply a frequency domain-to-time domain transform to the 2K sequences of filterbank domain values (e.g., QMF domain frequency components) output from the FDNs, and to assemble the transformed values into a left channel time domain signal (indicative of audio content of the mono downmix to which late reverberation has been applied) and a right channel time domain signal (also indicative of audio content of the mono downmix to which late reverberation has been applied). These left channel and right channel signals are output to element 210.

In a typical implementation each of the FDNs 203, 204, . . . , and 205, is implemented in the QMF domain, and filterbank 202 transforms the mono downmix from subsystem 201 into the QMF domain (e.g., the hybrid complex quadrature mirror filter (HCQMF) domain), so that the signal asserted from filterbank 202 to an input of each of FDNs 203, 204, . . . , and 205 is a sequence of QMF domain frequency components. In such an implementation, the signal asserted from filterbank 202 to FDN 203 is a sequence of QMF domain frequency components in a first frequency band, the signal asserted from filterbank 202 to FDN 204 is a sequence of QMF domain frequency components in a second frequency band, and the signal asserted from filterbank 202 to FDN 205 is a sequence of QMF domain frequency components in a "K"th frequency band. When analysis filterbank 202 is so implemented, synthesis filterbank 207 is configured to apply a QMF domain-to-time domain transform to the 2K sequences of output QMF domain frequency components from the FDNs, to generate the left channel and right channel late-reverbed time-domain signals which are output to element 210.

For example, if K=3 in the FIG. 3 system, then there are six inputs to synthesis filterbank 207 (left and right channels, comprising frequency-domain or QMF domain samples, output from each of FDNs 203, 204, and 205) and two outputs from 207 (left and right channels, each consisting of time domain samples). In this example, filterbank 207 would typically be implemented as two synthesis filterbanks: one (to which the three left channels from FDNs 203, 204, and 205 would be asserted) configured to generate the time-domain left channel signal output from filterbank 207; and a second one (to which the three right channels from FDNs 203, 204, and 205 would be asserted) configured to generate the time-domain right channel signal output from filterbank 207.

Optionally, control subsystem 209 is coupled to each of the FDNs 203, 204, . . . , 205, and configured to assert control parameters to each of the FDNs to determine the late reverberation portion (LBRIR) which is applied by subsystem 200. Examples of such control parameters are described below. It is contemplated that in some implementations control subsystem 209 is operable in real time (e.g., in response to user commands asserted thereto by an input device) to implement real time variation of the late reverberation portion (LBRIR) applied by subsystem 200 to the monophonic downmix of input channels.

For example, if the input signal to the FIG. 2 system is a 5.1-channel signal (whose full frequency range channels are in the following channel order: L, R, C, Ls, Rs), all the full frequency range channels have the same source distance, and downmixing subsystem 201 can be implemented as the following downmix matrix, which simply sums the full frequency range channels to form a mono downmix:

$$D=[1\ \ 1\ \ 1\ \ 1\ \ 1]$$

After all-pass filtering (in element 301 in each of FDNs 203, 204, . . . , and 205), the mono downmix is up-mixed to the four reverb tanks in a power-conservative way:

$$U=\begin{bmatrix}1/\sqrt{4}\\1/\sqrt{4}\\1/\sqrt{4}\\1/\sqrt{4}\end{bmatrix}$$

Alternatively (as an example), we can choose to pan the left-side channels to the first two reverb tanks, the right-side channels to the last two reverb tanks, and the center channel to all reverb tanks. In this case, downmixing subsystem 201 would be implemented to form two downmix signals:

$$D = \begin{bmatrix} 1 & 0 & 1/\sqrt{2} & 1 & 0 \\ 0 & 1 & 1/\sqrt{2} & 0 & 1 \end{bmatrix}$$

In this example, the upmixing to the reverb tanks (in each of FDNs 203, 204, . . . , and 205) is:

$$U = \begin{bmatrix} 1/\sqrt{2} & 0 \\ 1/\sqrt{2} & 0 \\ 0 & 1/\sqrt{2} \\ 0 & 1/\sqrt{2} \end{bmatrix}$$

Because there are two downmix signals, the all-pass filtering (in element 301 in each of FDNs 203, 204, . . . , and 205) needs to be applied twice. Diversity would be introduced for the late responses of (L, Ls), (R, Rs) and C despite all of them having the same macro attributes.

When the input signal channels have different source distances, proper delays and gains would still need to be applied in the downmixing process.

We next describe considerations for specific implementations of downmixing subsystem 201, and subsystems 100 and 200 of the FIG. 3 virtualizer.

The downmixing process implemented by subsystem 201 depends on the source distance (between the sound source and assumed listener position) for each channel to be downmixed, and the handling of direct response. The delay of the direct response $t_d$ is:

$$t_d = d/v_s$$

where d is the distance between the sound source and the listener and vs is the speed of sound. Furthermore, the gain of the direct response is proportional to lid. If these rules are preserved in the handling of direct responses of channels with different source distances, subsystem 201 can implement a straight downmixing of all channels because the delay and level of the late reverberation is generally insensitive to the source location.

Due to practical considerations, virtualizers (e.g., subsystem 100 of the virtualizer of FIG. 3) may be implemented to time-align the direct responses for the input channels having different source distances. In order to preserve the relative delay between direct response and late reverberation for each channel, a channel with source distance d should be delayed by $(dmax-d)/v_s$ before being downmixed with other channels. Here dmax denotes the maximum possible source distance.

Virtualizers (e.g., subsystem 100 of the virtualizer of FIG. 3) may also be implemented to compress the dynamic range of the direct responses. For example, the direct response for a channel with source distance d may be scaled by a factor of $d^{-\alpha}$, where $0 \le \alpha \le 1$, instead of $d^{-1}$. In order to preserve the level difference between the direct response and late reverberation, downmixing subsystem 201 may need to be implemented to scale a channel with source distance d by a factor of $d^{1-\alpha}$ before downmixing it with other scaled channels.

Figure 4:
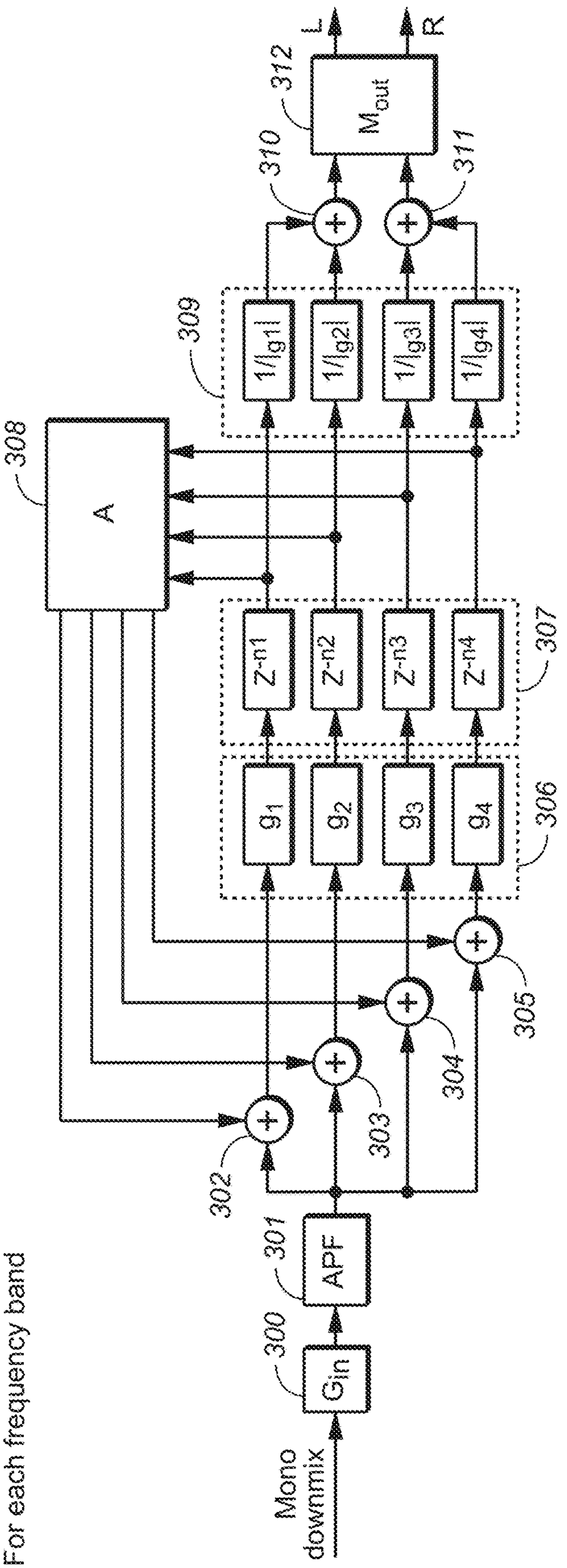
FIG. 4 is a block diagram of an FDN of a type included in a typical implementation of the FIG. 3 system.

The feedback delay network of FIG. 4 is an exemplary implementation of FDN 203 (or 204 or 205) of FIG. 3. Although the FIG. 4 system has four reverb tanks (each including a gain stage, $g_i$, and a delay line, $z^{-ni}$, coupled to the output of the gain stage) variations thereon the system (and other FDNs employed in embodiments of the inventive virtualizer) implement more than or less than four reverb tanks.

The FDN of FIG. 4 includes input gain element 300, all-pass filter (APF) 301 coupled to the output of element 300, addition elements 302, 303, 304, and 305 coupled to the output of APF 301, and four reverb tanks (each comprising a gain element, $g_k$ (one of elements 306), a delay line, $z^{-M_k}$ (one of elements 307) coupled thereto, and a gain element, $1/g_k$ (one of elements 309) coupled thereto, where $0 \le k-1 \le 3$) each coupled to the output of a different one of elements 302, 303, 304, and 305. Unitary matrix 308 is coupled to the outputs of the delay lines 307, and is configured to assert a feedback output to a second input of each of elements 302, 303, 304, and 305. The outputs of two of gain elements 309 (of the first and second reverb tanks) are asserted to inputs of addition element 310, and the output of element 310 is asserted to one input of output mixing matrix 312. The outputs of the other two of gain elements 309 (of the third and fourth reverb tanks) are asserted to inputs of addition element 311, and the output of element 311 is asserted to the other input of output mixing matrix 312.

Element 302 is configured to add the output of matrix 308 which corresponds to delay line $z^{-n1}$ (i.e., to apply feedback from the output of delay line $z^{-n1}$ via matrix 308) to the input of the first reverb tank. Element 303 is configured to add the output of matrix 308 which corresponds to delay line $z^{-n2}$ (i.e., to apply feedback from the output of delay line $z^{-n2}$ via matrix 308) to the input of the second reverb tank. Element 304 is configured to add the output of matrix 308 which corresponds to delay line $z^{-n3}$ (i.e., to apply feedback from the output of delay line $z^{-n3}$ via matrix 308) to the input of the third reverb tank. Element 305 is configured to add the output of matrix 308 which corresponds to delay line $z^{-n4}$ (i.e., to apply feedback from the output of delay line $z^{-n4}$ via matrix 308) to the input of the fourth reverb tank.

Input gain element 300 of the FDN of FIG. 4 is coupled to receive one frequency band of the transformed monophonic downmix signal (a filterbank domain signal) which is output from analysis filterbank 202 of FIG. 3. Input gain element 300 applies a gain (scaling) factor, $G_{in}$, to the filterbank domain signal asserted thereto. Collectively, the scaling factors $G_{in}$ (implemented by all the FDNs 203, 204, . . . , 205 of FIG. 3) for all the frequency bands control the spectral shaping and level of the late reverberation. Setting the input gains, $G_{in}$, in all the FDNs of the FIG. 3 virtualizer often takes into account of the following targets:

a direct-to-late ratio (DLR), of the BRIR applied to each channel, that matches real rooms;

necessary low-frequency attenuation to mitigate excess combing artifacts and/or low-frequency rumble; and matching of the diffuse field spectral envelope.

If we assume the direct response (applied by subsystem 100 of FIG. 3) provides unitary gain in all frequency bands, a specific DLR (power ratio) can be achieved by setting $G_{in}$ to be:

$$G_{in} = sqrt(\ln(10^6)/(T60 * DLR)),$$

where T60 is the reverb decay time defined as the time it takes for the reverberation to decay by 60 dB (it is determined by the reverb delays and reverb gains discussed below), and "ln" denotes the natural logarithmic function.

The input gain factor, $G_{in}$, may be dependent on the content that is being processed. One application of such content dependency is to ensure that the energy of the downmix in each time/frequency segment is equal to the sum of the energies of the individual channel signals that are being downmixed, irrespective of any correlation that may exist between the input channel signals. In that case, the input gain factor can be (or can be multiplied by) a term similar or equal to:

$$\sqrt{\frac{\sum_i \sum_j x_i^2(j)}{\sum_j y^2(j)}}$$

in which i is an index over all downmix samples of a given time/frequency tile or subband, y(i) are the downmix samples for the tile, and $x_i(j)$ is the input signal (for channel $X_i$) asserted to the input of downmixing subsystem 201.

In a typical QMF-domain implementation of the FDN of FIG. 4, the signal asserted from the output of all-pass filter (APF) 301 to the inputs of the reverb tanks is a sequence of QMF domain frequency components. To generate more natural sounding FDN output, APF 301 is applied to output of gain element 300 to introduce phase diversity and increased echo density. Alternatively, or additionally, one or more all-pass delay filters may be applied to: the individual inputs to downmixing subsystem 201 (of FIG. 3) before they are downmixed in subsystem 201 and processed by the FDN; or in the reverb tank feed-forward or feed-back paths depicted in FIG. 4 (e.g., in addition or replacement of delay lines $z^{-M_k}$ in each reverb tank; or the outputs of the FDN (i.e., to the outputs of output matrix 312).

In implementing the reverb tank delays, $z^{-ni}$, the reverb delays $n_i$ should be mutually prime numbers to avoid the reverb modes aligning at the same frequency. The sum of the delays should be large enough to provide sufficient modal density in order to avoid artificial sounding output. But the shortest delays should be short enough to avoid excess time gap between the late reverberation and the other components of the BRIR.

Typically, the reverb tank outputs are initially panned to either the left or the right binaural channel. Normally, the sets of reverb tank outputs being panned to the two binaural channels are equal in number and mutually exclusive. It is also desired to balance the timing of the two binaural channels. So if the reverb tank output with the shortest delay goes to one binaural channel, the one with the second shortest delay would go the other channel.

The reverb tank delays can be different across frequency bands so as to change the modal density as a function of frequency. Generally, lower frequency bands require higher modal density, thus the longer reverb tank delays.

The amplitudes of the reverb tank gains, $g_i$, and the reverb tank delays jointly determine the reverb decay time of the FDN of FIG. 4:

$$T_{60} = -3n_i/\log_{10}(g_i)/F_{FRM}$$

where $F_{FRM}$ is the frame rate of filterbank 202 (of FIG. 3). The phases of the reverb tank gains introduce fractional delays to overcome the issues related to reverb tank delays being quantized to the downsample-factor grid of the filterbank.

The unitary feedback matrix 308 provides even mixing among the reverb tanks in the feedback path.

To equalize the levels of the reverb tank outputs, gain elements 309 apply a normalization gain, $1/|g_i|$ to the output of each reverb tank, to remove the level impact of the reverb tank gains while preserving fractional delays introduced by their phases.

Output mixing matrix 312 (also identified as matrix $M_{out}$) is a 2×2 matrix configured to mix the unmixed binaural channels (the outputs of elements 310 and 311, respectively) from initial panning to achieve output left and right binaural channels (the L and R signals asserted at the output of matrix 312) having desired interaural coherence. The ummixed binaural channels are close to being uncorrelated after the initial panning because they do not consist of any common reverb tank output. If the desired interaural coherence is Coh, where |Coh|≤1, output mixing matrix 312 may be defined as:

$$M_{out} = \begin{bmatrix} \cos\beta & \sin\beta \\ \sin\beta & \cos\beta \end{bmatrix},$$

Because the reverb tank delays are different, one of the unmixed binaural channels would lead the other constantly. If the combination of reverb tank delays and panning pattern is identical across frequency bands, sound image bias would result. This bias can be mitigated if the panning pattern is alternated across the frequency bands such that the mixed binaural channels lead and trail each other in alternating frequency bands. This can be achieved by implementing the output mixing matrix 312 so as to have form as set forth in the previous paragraph in odd-numbered frequency bands (i.e., in the first frequency band (processed by FDN 203 of FIG. 3), the third frequency band, and so on), and to have the following form in even-numbered frequency bands (i.e., in the second frequency band (processed by FDN 204 of FIG. 3), the fourth frequency band, and so on):

$$M_{out,alt} = \begin{bmatrix} \sin\beta & \cos\beta \\ \cos\beta & \sin\beta \end{bmatrix}$$

where the definition of β remains the same. It should be noted that matrix 312 can be implemented to be identical in the FDNs for all frequency bands, but the channel order of its inputs may be switched for alternating ones of the frequency bands (e.g., the output of element 310 may be asserted to the first input of matrix 312 and the output of element 311 may be asserted to the second input of matrix 312 in odd frequency bands, and the output of element 311 may be asserted to the first input of matrix 312 and the output of element 310 may be asserted to the second input of matrix 312 in even frequency bands.

In the case that frequency bands are (partially) overlapping, the width of the frequency range over which matrix 312's form is alternated can be increased (e.g., it could alternated once for every two or three consecutive bands), or the value of β in the above expressions (for the form of matrix 312) can be adjusted to ensure that the average coherence equals the desired value to compensate for spectral overlap of consecutive frequency bands.

If the above-defined target acoustic attributes T60, Coh, and DLR are known for the FDN for each specific frequency band in the inventive virtualizer, each of the FDNs (each of which may have the structure shown in FIG. 4) can be configured to achieve the target attributes. Specifically, in some embodiments the input gain ($G_{in}$) and reverb tank gains and delays ($g_i$ and $n_i$) and parameters of output matrix $M_{out}$ for each FDN can be set (e.g., by control values asserted thereto by control subsystem 209 of FIG. 3) to achieve the target attributes in accordance with the relationships described herein. In practice, setting the frequency-dependent attributes by models with simple control parameters is often sufficient to generate natural sounding late reverberation that matches specific acoustic environments.

We next describe an example of how a target reverb decay time ($T_{60}$) for the FDN for each specific frequency band of an embodiment of the inventive virtualizer can be determined, by determining the target reverb decay time ($T_{60}$) for each of a small number of frequency bands. The level of FDN response decays exponentially over time. $T_{60}$ is inversely proportional to the decay factor, df (defined as dB decay over a unit of time):

$$T_{60} = 60/df.$$

The decay factor, df, depends on frequency and generally increases linearly versus the log-frequency scale, so the reverb decay time is also a function of frequency which generally decreases as frequency increases. Therefore, if one determines (e.g., sets) the $T_{60}$ values for two frequency points, the $T_{60}$ curve for all frequencies is determined. For example, if the reverb decay times for frequency points $f_A$ and $f_B$ are $T_{60,A}$ and $T_{60,B}$, respectively, the $T_{60}$ curve is defined as:

$$T_{60}(f) = \frac{T_{60,A}T_{60,B}\log(f_B/f_A)}{T_{60,A}\log(f/f_A) - T_{60,B}\log(f/f_B)}$$

Figure 5:
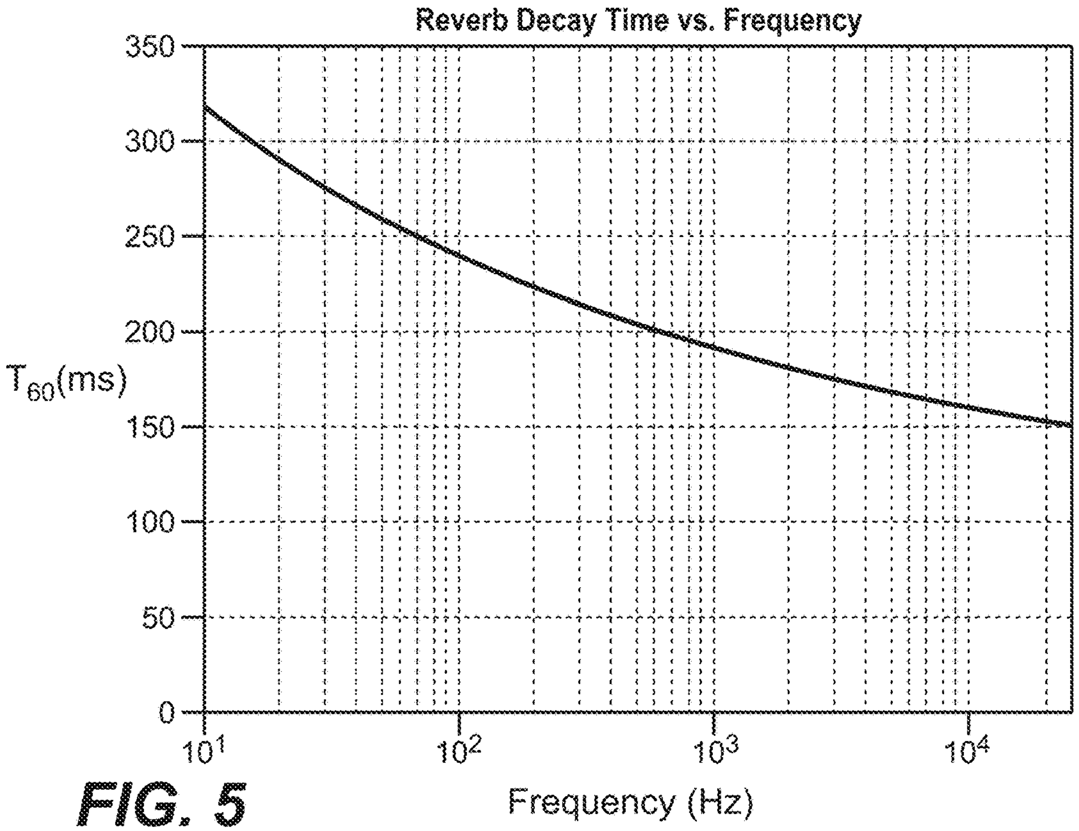
FIG. 5 is a graph of reverb decay time ($T_{60}$) in milliseconds as a function of frequency in Hz, which may be achieved by an embodiment of the inventive virtualizer for which the value of $T_{60}$ at each of two specific frequencies ($f_A$ and $f_B$) is set as follows: $T_{60,A}$=320 ms at $f_A$=10 Hz, and $T_{60,B}$=150 ms at $f_B$=2.4 kHz.

FIG. 5 shows an example of a $T_{60}$ curve which may be achieved by an embodiment of the inventive virtualizer for which the $T_{60}$ value at each of two specific frequencies ($f_A$ and $f_B$) is set: $T_{60,A}$=320 ms at $f_A$=10 Hz, and $T_{60,B}$=150 ms at $f_B$=2.4 kHz We next describe an example of how a target Interaural coherence (Coh) for the FDN for each specific frequency band of an embodiment of the inventive virtualizer can be achieved by setting a small number of control parameters. The Interaural coherence (Coh) of the late reverberation largely follows the pattern of a diffuse sound field. It can be modeled by a sinc function up to a cross-over frequency $f_C$, and a constant above the cross-over frequency. A simple model for the Coh curve is:

$$Coh(f) = \begin{cases} Coh_{min} + (Coh_{max} - Coh_{min})\text{sinc}(f/f_c), & f \le f_c \\ Coh_{min}, & f \ge f_c \end{cases}$$

where the parameters $Coh_{min}$ and $Coh_{max}$ satisfy $-1 \le Coh_{min} < Coh_{max} \le 1$, and control the range of Coh.

Figure 6:
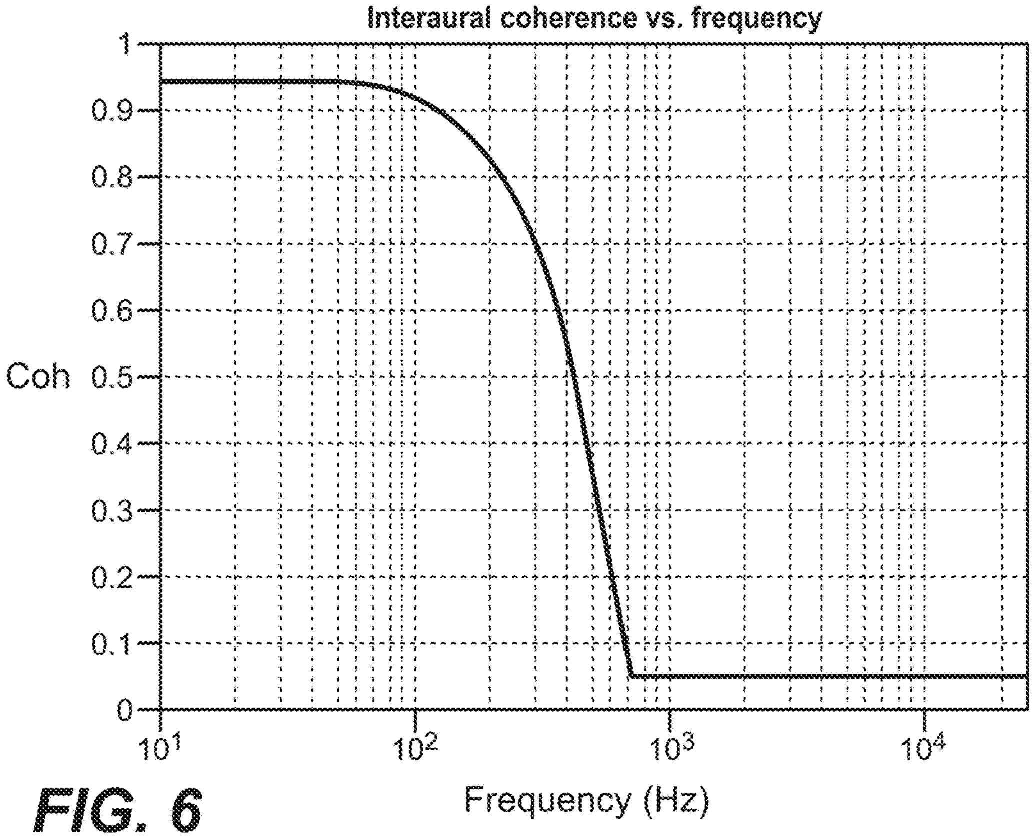
FIG. 6 is graph of Interaural coherence (Coh) as a function of frequency in Hz, which may be achieved by an embodiment of the inventive virtualizer for which the control parameters $Coh_{max}$, $Coh_{min}$, and $f_C$ are set to have the following values: $Coh_{max}$=0.95, $Coh_{min}$=0.05, and $f_C$=700 Hz.

The optimal cross-over frequency $f_C$ depends on the head size of the listener. A too high $f_C$ leads to internalized sound source image, while a too small value leads to dispersed or split sound source image. FIG. 6 is an example of a Coh curve which may be achieved by an embodiment of the inventive virtualizer for which the control parameters $Coh_{max}$, $Coh_{min}$, and $f_C$ are set to have the following values: $Coh_{max}$=0.95, $Coh_{min}$=0.05, and $f_C$=700 Hz.

We next describe an example of how a target direct-to-late ratio (DLR) for the FDN for each specific frequency band of an embodiment of the inventive virtualizer can be achieved by setting a small number of control parameters. The Direct-to-late ratio (DLR), in dB, generally increases linearly versus the log-frequency scale. It can be controlled by setting $DLR_{1K}$ (DLR in dB@1 kHz) and $DLR_{slope}$ (in dB per 10× frequency). However, low DLR in the lower frequency range often results in excessive combing artifact. In order to mitigate the artifact, two modifying mechanisms are added to the control the DLR:

a minimum DLR floor, DLRmin (in dB); and a high-pass filter defined by a transition frequency, $f_T$, and the slope of attenuation curve below it, $HPF_{slope}$ (in dB per 10× frequency).

The resulting DLR curve in dB is defined as:

$$DLR(f) = \max(DLR_{1K} + DLR_{slope}\log_{10}(f/1000), DLR_{min}) + \min(HPF_{slope}\log_{10}(f/f_T), 0)$$

Figure 7:
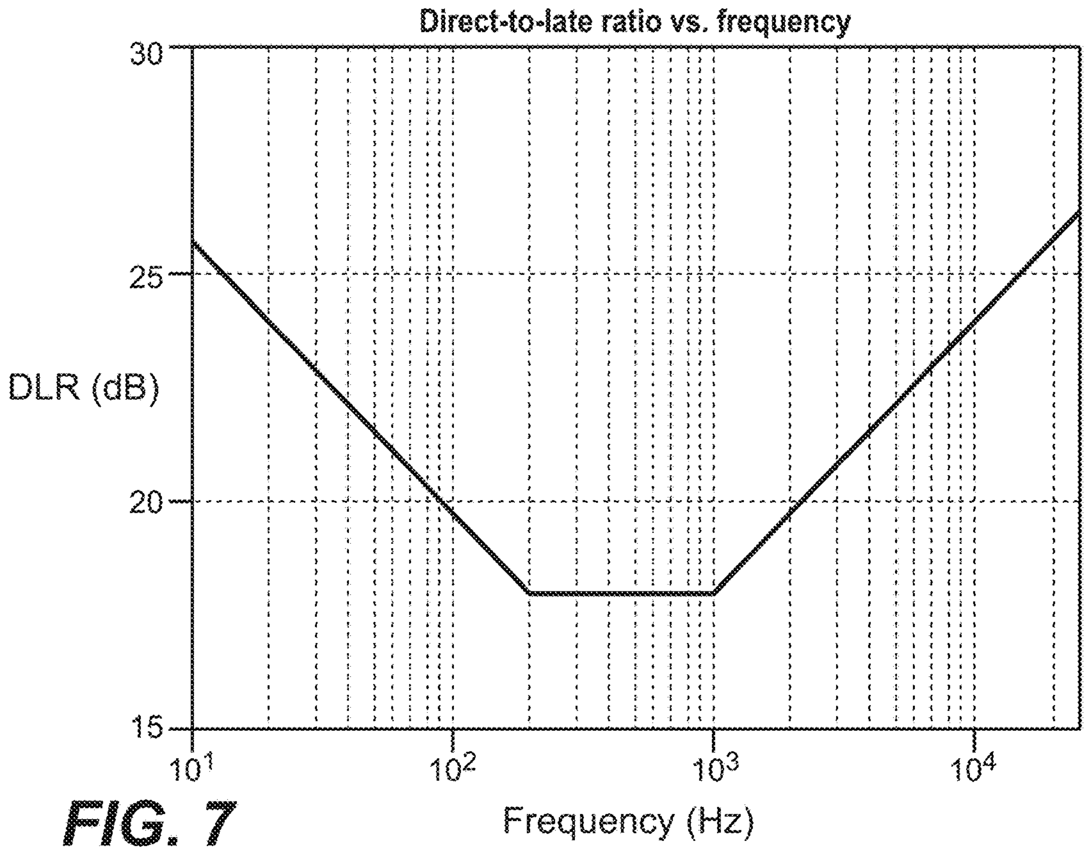
FIG. 7 is graph of direct-to-late ratio (DLR) with source distance of one meter, in dB, as a function of frequency in Hz, which may be achieved by an embodiment of the inventive virtualizer for which the control parameters $DLR_{1K}$, $DLR_{slope}$, $DLR_{min}$, $HPF_{slope}$, and $f_T$ are set to have the following values: $DLR_{1K}$=18 dB, $DLR_{slope}$=6 dB/10× frequency, $DLR_{min}$=18 dB, $HPF_{slope}$=6 dB/10× frequency, and $f_T$=200 Hz.

It should be noted that DLR changes with source distance even in the same acoustic environment. Therefore, both $DLR_{1K}$ and $DLR_{min}$ here are the values for a nominal source distance, such as 1 meter. FIG. 7 is an example of a DLR curve for 1-meter source distance achieved by an embodiment of the inventive virtualizer with control parameters $DLR_{1K}$, $DLR_{slope}$, $DLR_{min}$, $HPF_{slope}$, and $f_T$ set to have the following values: $DLR_{1K}$=18 dB, $DLR_{slope}$=6 dB/10× frequency, $DLR_{min}$=18 dB, $HPF_{slope}$=6 dB/10× frequency, and $f_T$=200 Hz.

Variations on the embodiments disclosed herein have one or more of the following features:

the FDNs of the inventive virtualizer are implemented in the time-domain, or they have hybrid implementation with FDN-based impulse response capturing and FIR-based signal filtering.

the inventive virtualizer is implemented to allow application of energy compensation as a function of frequency during performance of the downmixing step which generates the downmixed input signal for the late reverberation processing subsystem; and the inventive virtualizer is implemented to allow for manual or automatic control of the applied late reverberation attributes in response to external factors (i.e., in response to the setting of control parameters).

For applications in which system latency is critical and the delay caused by analysis and synthesis filterbanks is prohibitive, the filterbank-domain FDN structure of typical embodiments of the inventive virtualizer can be translated into the time domain, and each FDN structure can be implemented in the time domain in a class of embodiments of the virtualizer. In time domain implementations, the subsystems which apply the input gain factor ($G_{in}$), reverb tank gains ($g_i$), and normalization gains ($1/|g_i|$) are replaced by filters with similar amplitude responses in order to allow frequency-dependent controls. The output mixing matrix ($M_{out}$) is also replaced by a matrix of filters. Unlike for the other filters, the phase response of this matrix of filters is critical as power conservation and interaural coherence might be affected by the phase response. The reverb tank delays in a time domain implementation may need to be slightly varied (from their values in a filterbank domain implementation) to avoid sharing the filterbank stride as a common factor. Due to various constraints, the performance of time-domain implementations of the FDNs of the inventive virtualizer might not exactly match that of filterbank-domain implementations thereof.

Figure 8:
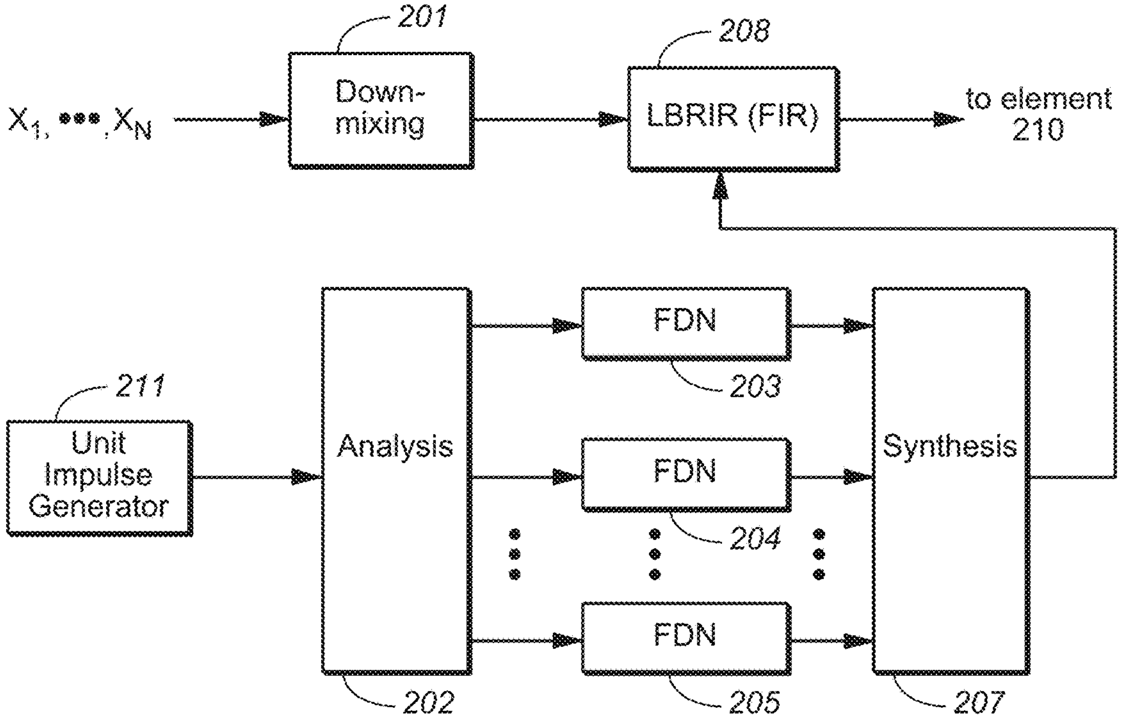
FIG. 8 is a block diagram of another embodiment of a late reverberation processing subsystem of the inventive headphone virtualization system.

With reference to FIG. 8, we next describe a hybrid (filterbank domain and time domain) implementation of the inventive late reverberation processing subsystem of the inventive virtualizer. This hybrid implementation of the inventive late reverberation processing subsystem is a variation on late reverberation processing subsystem 200 of FIG. 4, which implements FDN-based impulse response capturing and FIR-based signal filtering.

The FIG. 8 embodiment includes elements 201, 202, 203, 204, 205, and 207 which are identical to the identically numbered elements of subsystem 200 of FIG. 3. The above description of these elements will not be repeated with reference to FIG. 8. In the FIG. 8 embodiment, unit impulse generator 211 is coupled to assert an input signal (a pulse) to analysis filterbank 202. An LBRIR filter 208 (mono-in, stereo-out) implemented as an FIR filter applies the appropriate late reverberation portion of the BRIR (the LBRIR) to the monophonic downmix output from subsystem 201. Thus, elements 211, 202, 203, 204, 205, and 207 are a processing side-chain to the LBRIR filter 208.

Whenever the setting of the late reverberation portion LBRIR is to be modified, impulse generator 211 is operated to assert a unit impulse to element 202, and the resulting output from filterbank 207 is captured and asserted to filter 208 (to set the filter 208 to apply the new LBRIR determined by the output of filterbank 207). To accelerate the time lapse from the LBRIR setting change to the time that the new LBRIR takes effect, the samples of the new LBRIR can start replacing the old LBRIR as they becomes available. To shorten the inherent latency of the FDNs, initial zeros of the LBRIR can be discarded. These options provide flexibility and allow the hybrid implementation to provide potential performance improvement (relative to that provided by a filterbank domain implementation), at a cost of added computation from the FIR filtering.

For applications where system latency is critical, but computation power is less of a concern, the side-chain filterbank-domain late reverberation processor (e.g., that implemented by elements 211, 202, 203, 204, . . . , 205, and 207 of FIG. 8) can be used to capture the effective FIR impulse response to be applied by filter 208. FIR filter 208 can implement this captured FIR response and apply it directly to the mono downmix of input channels (during virtualization of the input channels).

The various FDN parameters and thus the resulting late-reverberation attributes can be manually tuned and subsequently hard-wired into an embodiment of the inventive late reverberation processing subsystem, for example by means of one or more presets that can be adjusted (e.g., by operating control subsystem 209 of FIG. 3) by the user of the system. However, given the high-level description of late reverberation, its relation with FDN parameters, and the ability to modify its behavior, a wide variety of methods are envisioned for controlling various embodiments of the FDN-based late reverberation processor, including (but not limited to) the following:

1. The end-user may manually control the FDN parameters, for example by means of a user-interface on a display (e.g., implemented by an embodiment of control subsystem 209 of FIG. 3) or switching presets using physical controls (e.g., implemented by an embodiment of control subsystem 209 of FIG. 3). In this way, the end user can adapt the room simulation according to taste, the environment, or the content;
2. The author of the audio content to be virtualized may provide settings or desired parameters that are conveyed with the content itself, for example by metadata provided with the input audio signal. Such metadata may be parsed and employed (e.g., by an embodiment of control subsystem 209 of FIG. 3) to control the relevant FDN parameters. Metadata may therefore be indicative of properties such as the reverberation time, the reverberation level, direct-to-reverberation ratio, and so on, and these properties may be time varying, signaled by time-varying metadata;
3. A playback device may be aware of its location or environment, by means of one or more sensors. For example, a mobile device may use GSM networks, global positioning system (GPS), known WiFi access points, or any other location service to determine where the device is. Subsequently, data indicative of location and/or environment may be employed (e.g., by an embodiment of control subsystem 209 of FIG. 3) to control the relevant FDN parameters. Thus the FDN parameters may be modified in response to the location of the device, e.g. to mimic the physical environment;
4. In relation to the location of the playback device, a cloud service or social media may be used to derive the most common settings consumers are using in a certain environment. Additionally, users may upload their current settings to a cloud or social media service, in association with the (known) location to make available for other users, or themselves;
5. A playback device may contain other sensors such as a camera, light sensor, microphone, accelerometer, gyroscope, to determine the activity of the user and the environment the user is in, to optimize FDN parameters for that particular activity and/or environment;
6. The FDN parameters may be controlled by the audio content. Audio classification algorithms, or manually-annotated content may indicate whether segments of the audio comprise speech, music, sound effects, silence, and alike. FDN parameters may be adjusted according to such labels. For example, the direct-to-reverberation ratio may be reduced for dialog to improve the dialog intelligibility. Additionally, video analysis may be used to determine the location of a current video segment, and FDN parameters may be adjusted accordingly to more closely simulate the environment depicted in the video; and/or
7. A solid-state playback system may use different FDN settings as a mobile device, e.g., settings may be device dependent. A solid-state system present in a living room may simulate a typical (fairly reverberant) living room scenario with distant sources, while a mobile device may render content closer to the listener.

Some implementations of the inventive virtualizer include FDNs (e.g., an implementation of the FDN of FIG. 4) which are configured to apply fractional delay as well as integer sample delay. For example, in one such implementation a fractional delay element is connected in each reverb tank in series with a delay line that applies integer delay equal to an integer number of sample periods (e.g., each fractional delay element is positioned after or otherwise in series with one of delay lines). Fractional delay can be approximated by a phase shift (unity complex multiplication) in each frequency band that corresponds to a fraction of the sample period: f=τ/T, where f is the delay fraction, t is the desired delay for the band, and T is the sample period for the band. It is well known how to apply fractional delay in the context of applying reverb in the QMF domain.

In a first class of embodiments, the invention is a headphone virtualization method for generating a binaural signal in response to a set of channels (e.g., each of the channels, or each of the full frequency range channels) of a multi-channel audio input signal, including steps of: (a) applying a binaural room impulse response (BRIR) to each channel of the set (e.g., by convolving each channel of the set with a BRIR corresponding to said channel, in subsystems 100 and 200 of FIG. 3, or in subsystems 12, . . . , 14, and 15 of FIG. 2), thereby generating filtered signals (e.g., the outputs of subsystems 100 and 200 of FIG. 3, or the outputs of subsystems 12, . . . , 14, and 15 of FIG. 2), including by using at least one feedback delay network (e.g., FDNs 203, 204, . . . , 205 of FIG. 3) to apply a common late reverberation to a downmix (e.g., a monophonic downmix) of the channels of the set; and (b) combining the filtered signals (e.g., in subsystem 210 of FIG. 3, or the subsystem comprising elements 16 and 18 of FIG. 2) to generate the binaural signal. Typically, a bank of FDNs is used to apply the common late reverberation to the downmix (e.g., with each FDN applying late reverberation to a different frequency band). Typically, step (a) includes a step of applying to each channel of the set a "direct response and early reflection" portion of a single-channel BRIR for the channel (e.g., in subsystem 100 of FIG. 3 or subsystems 12, . . . , 14 of FIG. 2), and the common late reverberation has been generated to emulate collective macro attributes of late reverberation portions of at least some (e.g., all) of the single-channel BRIRs.

In typical embodiments in the first class, each of the FDNs is implemented in the hybrid complex quadrature mirror filter (HCQMF) domain or the quadrature mirror filter (QMF) domain, and in some such embodiments, frequency-dependent spatial acoustic attributes of the binaural signal are controlled (e.g., using control subsystem 209 of FIG. 3) by controlling the configuration of each FDN employed to apply late reverberation. Typically, a monophonic downmix of the channels (e.g., the downmix generated by subsystem 201 of FIG. 3) is used as the input to the FDNs for efficient binaural rendering of audio content of the multi-channel signal. Typically, the downmixing process is controlled based on a source distance for each channel (i.e., distance between an assumed source of the channel's audio content and an assumed user position) and depends on the handling of the direct responses corresponding to the source distances in order to preserve the temporal and level structure of each BRIR (i.e., each BRIR determined by the direct response and early reflection portions of a single-channel BRIR for one channel, together with the common late reverberation for a downmix including the channel). Although the channels to be downmixed can be time-aligned and scaled in different ways during the downmixing, the proper level and temporal relationship between the direct response, early reflection, and common late reverberation portions of the BRIR for each channel should be maintained. In embodiments which use a single FDN bank to generate the common late reverberation portion for all channels which are downmixed (to generate a downmix), proper gain and delay need to be applied (to each channel which is downmixed) during generation of the downmix.

Typical embodiments in this class include a step of adjusting (e.g., using control subsystem 209 of FIG. 3) the FDN coefficients corresponding to frequency-dependent attributes (e.g., reverb decay time, interaural coherence, modal density, and direct-to-late ratio). This enables better matching of acoustic environments and more natural sounding outputs.

In a second class of embodiments, the invention is a method for generating a binaural signal in response to a multi-channel audio input signal, by applying a binaural room impulse response (BRIR) to each channel (e.g., by convolving each channel with a corresponding BRIR) of a set of the channels of the input signal (e.g., each of the input signal's channels or each full frequency range channel of the input signal), including by: processing each channel of the set in a first processing path (e.g., implemented by subsystem 100 of FIG. 3 or subsystems 12, . . . , 14 of FIG. 2) which is configured to model, and apply to said each channel, a direct response and early reflection portion (e.g., the EBRIR applied by subsystem 12, 14, or 15 of FIG. 2) of a single-channel BRIR for the channel; and processing a downmix (e.g., a monophonic downmix) of the channels of the set in a second processing path (e.g., implemented by subsystem 200 of FIG. 3 or subsystem 15 of FIG. 2), in parallel with the first processing path. The second processing path is configured to model, and apply to the downmix, a common late reverberation (e.g., the LBRIR applied by subsystem 15 of FIG. 2). Typically, the common late reverberation emulates collective macro attributes of late reverberation portions of at least some (e.g., all) of the single-channel BRIRs. Typically the second processing path includes at least one FDN (e.g., one FDN for each of multiple frequency bands). Typically, a mono downmix is used as the input to all reverb tanks of each FDN implemented by the second processing path. Typically, mechanisms are provided (e.g., control subsystem 209 of FIG. 3) for systematic control of macro attributes of each FDN in order to better simulate acoustic environments and produce more natural sounding binaural virtualization. Since most such macro attributes are frequency dependent, each FDN is typically implemented in the hybrid complex quadrature mirror filter (HCQMF) domain, the frequency domain, domain, or another filterbank domain, and a different FDN is used for each frequency band. A primary benefit of implementing the FDNs in a filterbank domain is to allow application of reverb with frequency-dependent reverberation properties. In various embodiments, the FDNs are implemented in any of a wide variety of filterbank domains, using any of a variety of filterbanks, including, but not limited to quadrature mirror filters (QMF), finite-impulse response filters (FIR filters), infinite-impulse response filters (IIR filters), or cross-over filters.

Some embodiments in the first class (and the second class) implement one or more of the following features:

1. a filterbank domain (e.g., hybrid complex quadrature mirror filter-domain) FDN implementation (e.g., the FDN implementation of FIG. 4), or hybrid filterbank domain FDN implementation and time domain late reverberation filter implementation (e.g., the structure described with reference to FIG. 8), which typically allows independent adjustment of parameters and/or settings of the FDN for each frequency band (which enables simple and flexible control of frequency-dependent acoustic attributes), for example, by providing the ability to vary reverb tank delays in different bands so as to change the modal density as a function of frequency;

2. The specific downmixing process, employed to generate (from the multi-channel input audio signal) the downmixed (e.g., monophonic downmixed) signal processed in the second processing path, depends on the source distance of each channel and the handling of direct response in order to maintain proper level and timing relationship between the direct and late responses;
3. An all-pass filter (e.g., APF 301 of FIG. 4) is applied in the second processing path (e.g., at the input or output of a bank of FDNs) to introduce phase diversity and increased echo density without changing the spectrum and/or timbre of the resulting reverberation;
4. Fractional delays are implemented in the feedback path of each FDN in a complex-valued, multi-rate structure to overcome issues related to delays quantized to the downsample-factor grid;
5. In the FDNs, the reverb tank outputs are linearly mixed directly into the binaural channels (e.g., by matrix 312 of FIG. 4), using output mixing coefficients which are set based on the desired interaural coherence in each frequency band. Optionally, the mapping of reverb tanks to the binaural output channels is alternating across frequency bands to achieve balanced delay between the binaural channels. Also optionally, normalizing factors are applied to the reverb tank outputs to equalize their levels while conserving fractional delay and overall power;
6. Frequency-dependent reverb decay time is controlled (e.g., using control subsystem 209 of FIG. 3) by setting proper combinations of reverb tank delays and gains in each frequency band to simulate real rooms;
7. one scaling factor is applied (e.g., by elements 306 and 309 of FIG. 4) per frequency band (e.g., at either the input or output of the relevant processing path), to:
   control a frequency-dependent direct-to-late ratio (DLR) that matches that of a real room (a simple model may be used to compute the required scaling factor based on target DLR and reverb decay time, e.g., T60);
   provide low-frequency attenuation to mitigate excess combing artifacts; and/or apply diffuse field spectral shaping to the FDN responses;
8. Simple parametric models are implemented (e.g., by control subsystem 209 of FIG. 3) for controlling essential frequency-dependent attributes of the late reverberation, such as reverb decay time, interaural coherence, and/or direct-to-late ratio.

Figure 9:
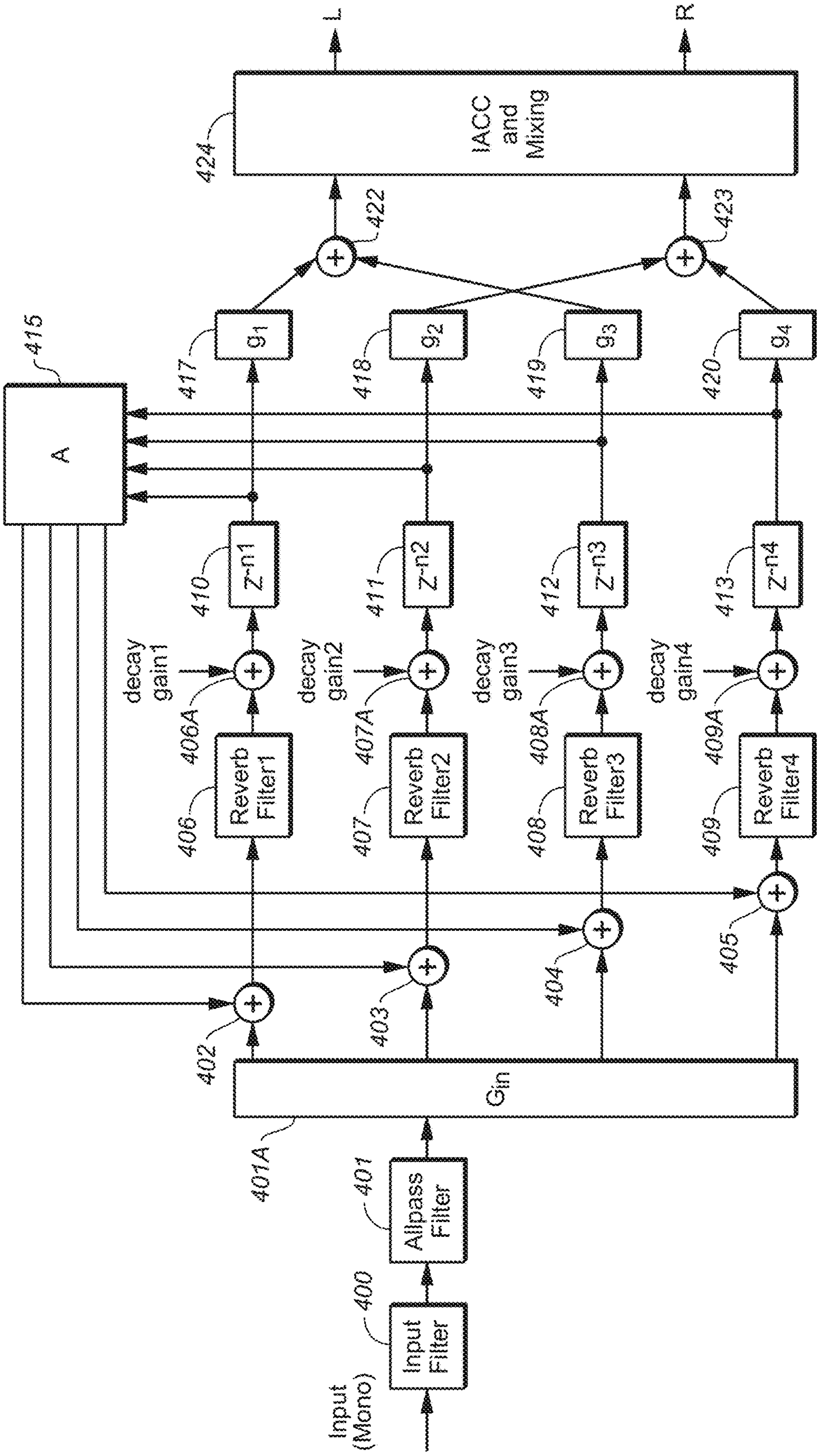
FIG. 9 is a block diagram of a time-domain implementation of an FDN, of a type included in some embodiments of the inventive system.
Figure 10:
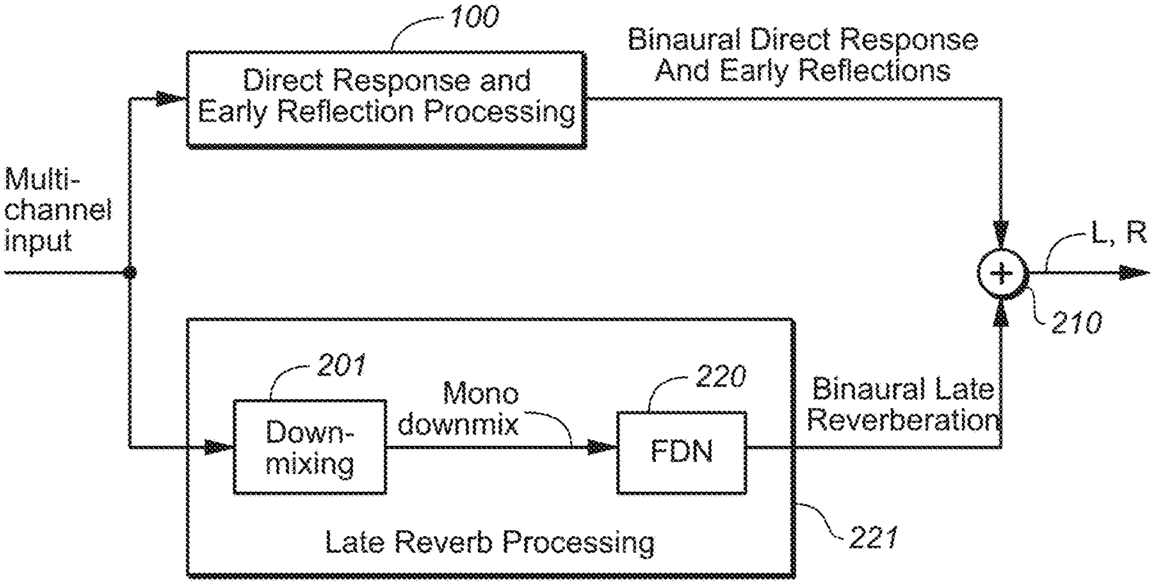
FIG. 10 is a block diagram of an embodiment of the inventive headphone virtualization system, in which late reverberation processing subsystem 221 is implemented in the time domain.

In some embodiments (e.g., for applications in which system latency is critical and the delay caused by analysis and synthesis filterbanks is prohibitive), the filterbank-domain FDN structures of typical embodiments of the inventive system (e.g., the FDN of FIG. 4 in each frequency band) are replaced by FDN structures implemented in the time domain (e.g., FDN 220 of FIG. 10, which may be implemented as shown in FIG. 9). In time-domain embodiments of the inventive system, the subsystems of filterbank-domain embodiments which apply an input gain factor ($G_{in}$), reverb tank gains ($g_i$), and normalization gains ($1/|g_i|$) are replaced by time-domain filters (and/or gain elements) in order to allow frequency-dependent controls. The output mixing matrix of a typical filterbank-domain implementation (e.g., output mixing matrix 312 of FIG. 4) is replaced (in typical time-domain embodiments) by an output set of time-domain filters (e.g., elements 500-503 of the FIG. 11 implementation of element 424 of FIG. 9). Unlike for the other filters of typical time-domain embodiments, the phase response of this output set of filters is typically critical (because power conservation and interaural coherence might be affected by the phase response). In some time-domain embodiments, the reverb tank delays are varied (e.g., slightly varied) from their values in a corresponding filterbank-domain implementation (e.g., to avoid sharing the filterbank stride as a common factor).

FIG. 10 is a block diagram of an embodiment of the inventive headphone virtualization system similar to that of FIG. 3, except in that elements 202-207 of the FIG. 3 system are replaced in the FIG. 10 system by a single FDN 220 which is implemented in the time domain (e.g., FDN 220 of FIG. 10 may be implemented as is the FDN of FIG. 9). In FIG. 10, two (left and right channel) time domain signals are output from direct response and early reflection processing subsystem 100, and two (left and right channel) time domain signals are output from late reverberation processing subsystem 221. Addition element 210 is coupled to the outputs of subsystems 100 and 200. Element 210 is configured to combine (mix) the left channel outputs of subsystems 100 and 221 to generate the left channel, L, of the binaural audio signal output from the FIG. 10 virtualizer, and to combine (mix) the right channel outputs of subsystems 100 and 221 to generate the right channel, R, of the binaural audio signal output from the FIG. 10 virtualizer. Element 210 can be implemented to simply sum corresponding left channel samples output from subsystems 100 and 221 to generate the left channel of the binaural output signal, and to simply sum corresponding right channel samples output from subsystems 100 and 221 to generate the right channel of the binaural output signal, assuming that appropriate level adjustments and time alignments are implemented in the subsystems 100 and 221.

In the FIG. 10 system, the multi-channel audio input signal (which has channels, $X_i$) are directed to, and undergo processing in, two parallel processing paths: one through direct response and early reflection processing subsystem 100; the other through late reverberation processing subsystem 221. The FIG. 10 system is configured to apply a $BRIR_i$ to each channel, $X_i$. Each $BRIR_i$ can be decomposed into two portions: a direct response and early reflection portion (applied by subsystem 100), and a late reverberation portion (applied by subsystem 221). In operation, direct response and early reflection processing subsystem 100 thus generates the direct response and the early reflections portions of the binaural audio signal which is output from the virtualizer, and late reverberation processing subsystem ("late reverberation generator") 221 thus generates the late reverberation portion of the binaural audio signal which is output from the virtualizer. The outputs of subsystems 100 and 221 are mixed (by subsystem 210) to generate the binaural audio signal, which is typically asserted from subsystem 210 to a rendering system (not shown) in which it undergoes binaural rendering for playback by headphones.

Downmixing subsystem 201 (of late reverberation processing subsystem 221) is configured to downmix the channels of the multi-channel input signal into a mono downmix (which is time domain signal), and FDN 220 is configured to apply the late reverberation portion to the mono downmix.

With reference to FIG. 9, we next describe an example of a time-domain FDN which can be employed as FDN 220 of the FIG. 10 virtualizer. The FDN of FIG. 9 includes input filter 400, which is coupled to receive a mono downmix (e.g., generated by subsystem 201 of the FIG. 10 system) of all channels of a multi-channel audio input signal. The FDN of FIG. 9 also includes all-pass filter (APF) 401 (which corresponds to APF 301 of FIG. 4) coupled to the output of filter 400, input gain element 401A coupled to the output of filter 401, addition elements 402, 403, 404, and 405 (which correspond to addition elements 302, 303, 304, and 305 of FIG. 4) coupled to the output of element 401A, and four reverb tanks. Each reverb tank is coupled to the output of a different one of elements 402, 403, 404, and 405, and comprises one of reverb filters 406 and 406A, 407 and 407A, 408 and 408A, and 409 and 409A, one of delay lines 410, 411, 412, and 413 (corresponding to delay lines 307 of FIG. 4) coupled thereto, and one of gain elements 417, 418, 419, and 420 coupled to the output of one of the delay lines.

Unitary matrix 415 (corresponding to unitary matrix 308 of FIG. 4, and typically implemented to be identical to matrix 308) is coupled to the outputs of the delay lines 410, 411, 412, and 413. Matrix 415 is configured to assert a feedback output to a second input of each of elements 402, 403, 404, and 405.

When the delay (n1) applied by line 410 is shorter than that (n2) applied by line 411, the delay applied by line 411 is shorter than that (n3) applied by line 412, and the delay applied by line 412 is shorter than that (n4) applied by line 413, the outputs of gain elements 417 and 419 (of the first and third reverb tanks) are asserted to inputs of addition element 422, and the outputs of gain elements 418 and 420 (of the second and fourth reverb tanks) are asserted to inputs of addition element 423. The output of element 422 is asserted to one input of IACC and mixing filter 424, and the output of element 423 is asserted to the other input of IACC filtering and mixing stage 424.

Examples of implementations of gain elements 417-420 and elements 422, 423, and 424 of FIG. 9 will be described with reference to a typical implementation of elements 310 and 311 and output mixing matrix 312 of FIG. 4. Output mixing matrix 312 of FIG. 4 (also identified as matrix $M_{out}$) is a 2×2 matrix configured to mix the unmixed binaural channels (the outputs of elements 310 and 311, respectively) from initial panning to generate left and right binaural output channels (the left ear, "L", and right ear, "R", signals asserted at the output of matrix 312) having desired interaural coherence. This initial panning is implemented by elements 310 and 311, each of which combines two reverb tank outputs to generate one of the unmixed binaural channels, with the reverb tank output having the shortest delay being asserted to an input of element 310 and the reverb tank output having the second shortest delay asserted to an input of element 311. Elements 422 and 423 of the FIG. 9 embodiment perform the same type of initial panning (on the time domain signals asserted to their inputs) as elements 310 and 311 (in each frequency band) of the FIG. 4 embodiment perform on the streams of filterbank domain components (in the relevant frequency band) asserted to their inputs.

The unmixed binaural channels (output from elements 310 and 311 of FIG. 4, or from elements 422 and 423 of FIG. 9), which are close to being uncorrelated because they do not consist of any common reverb tank output, may be mixed (by matrix 312 of FIG. 4 or stage 424 of FIG. 9) to implement a panning pattern which achieves a desired interaural coherence for the left and right binaural output channels. However, because the reverb tank delays are different in each FDN (i.e., the FDN of FIG. 9, or the FDN implemented for each different frequency band in FIG. 4), one unmixed binaural channel (the output of one of elements 310 and 311, or 422 and 423) constantly leads the other unmixed binaural channel (the output of the other one of elements 310 and 311, or 422 and 423).

Thus, in the FIG. 4 embodiment, if the combination of reverb tank delays and panning pattern is identical across all the frequency bands, sound image bias would result. This bias can be mitigated if the panning pattern is alternated across the frequency bands such that the mixed binaural output channels lead and trail each other in alternating frequency bands. For example, if the desired interaural coherence is Coh, where |Coh|≤1, the output mixing matrix 312 in odd-numbered frequency bands may be implemented to multiply the two inputs asserted thereto by a matrix having the following form:

$$M_{out} = \begin{bmatrix} \cos\beta & \sin\beta \\ \sin\beta & \cos\beta \end{bmatrix},$$

where β=arcsin(Coh)/2.

and the output mixing matrix 312 in even-numbered frequency bands may be implemented to multiply the two inputs asserted thereto by a matrix having the following form:

$$M_{out,alt} = \begin{bmatrix} \sin\beta & \cos\beta \\ \cos\beta & \sin\beta \end{bmatrix}$$

where β=arcsin(Coh)/2.

Alternatively, the above-noted sound image bias in the binaural output channels can be mitigated by implementing matrix 312 to be identical in the FDNs for all frequency bands, if the channel order of its inputs is switched for alternating ones of the frequency bands (e.g., the output of element 310 may be asserted to the first input of matrix 312 and the output of element 311 may be asserted to the second input of matrix 312 in odd frequency bands, and the output of element 311 may be asserted to the first input of matrix 312 and the output of element 310 may be asserted to the second input of matrix 312 in even frequency bands).

In the FIG. 9 embodiment (and other time-domain embodiments of an FDN of the inventive system), it is non-trivial to alternate panning based on frequency to address sound image bias that would otherwise result when the unmixed binaural channel output from element 422 constantly leads (or lags) the unmixed binaural channel output from element 423. This sound image bias is addressed in a typical time-domain embodiment of an FDN of the inventive system in a different way than it is typically addressed in a filterbank-domain embodiment of an FDN of the inventive system. Specifically, in the FIG. 9 embodiment (and some other time-domain embodiments of an FDN of the inventive system), the relative gains of the unmixed binaural channels (e.g., those output from elements 422 and 423 of FIG. 9) are determined by gain elements (e.g., elements 417, 418, 419, and 420 of FIG. 9) so as to compensate for the sound image bias that would otherwise result due to the noted unbalanced timing. By implementing a gain element (e.g., element 417) to attenuate the earliest-arriving signal (which has been panned to one side, e.g., by element 422) and implementing a gain element (e.g., element 418) to boost the next-earliest signal (which has been panned to the other side, e.g., by element 423), the stereo image is re-centered. Thus, the reverb tank including gain element 417 applies a first gain to the output of element 417, and the reverb tank including gain element 418 applies a second gain (different than the first gain) to the output of element 418, so that the first gain and the second gain attenuate the first unmixed binaural channel (output from element 422) relative to the second unmixed binaural channel (output from element 423).

More specifically, in a typical implementation of the FDN of FIG. 9, the four delay lines 410, 411, 412, and 413 have increasing length, with increasing delay values n1, n2, n3, and n4, respectively. In this implementation, filter 417 applies again of $g_1$. Thus, the output of filter 417 is a delayed version of the input to delay line 410 to which a gain of $g_1$ has been applied. Similarly, filter 418 applies a gain of $g_2$, filter 419 applies a gain of $g_3$, and filter 420 applies a gain of $g_4$. Thus, the output of filter 418 is a delayed version of the input to delay line 411 to which a gain of $g_2$ has been applied, and the output of filter 419 is a delayed version of the input to delay line 412 to which a gain of $g_3$ has been applied, and the output of filter 420 is a delayed version of the input to delay line 413 to which a gain of $g_4$ has been applied.

In this implementation, choice of the following gain values may result in an undesirable bias of the output sound image (indicated by the binaural channels output from element 424) to one side (i.e., to the left or right channel): $g_1=0.5$, $g_2=0.5$, $g_3=0.5$, and $g_4=0.5$. In accordance with an embodiment of the invention, the gain values $g_1$, $g_2$, $g_3$, and $g_4$ (applied by elements 417, 418, 419, and 420, respectively) are chosen as follows to center the sound-image: $g_1=0.38$, $g_2=0.6$, $g_3=0.5$, and $g_4=0.5$. Thus, the output stereo image is re-centered in accordance with an embodiment of the invention by attenuating the earliest-arriving signal (which has been panned to one side, by element 422 in the example) relative to the second-latest arriving signal (i.e., by choosing $g_1<g_3$), and boosting the second-earliest signal (which has been panned to the other side, by element 423 in the example), relative to the latest arriving signal (i.e., by choosing $g_4<g_2$).

Typical implementations of the time-domain FDN of FIG. 9 have the following differences and similarities to the filterbank domain (CQMF domain) FDN of FIG. 4:

- the same unitary feedback matrix, A (matrix 308 of FIG. 4 and matrix 415 of FIG. 9);
- similar reverb tank delays, $n_i$ (i.e., the delays in the CQMF implementation of FIG. 4 may be $n_1=17*64\ T_s=1088*T_s$, $n_2=21*64\ T_s=1344*T_s$, $n_3=26*64\ T_s=1664*T_s$, and $n_4=29*64T_s=1856*T_s$, where $1/T_s$ is the sample rate ($1/T_s$ is typically equal to 48K Hz), whereas the delays in the time-domain implementation may be: $n_1=1089*T_s$, $n_2=1345*T_s$, $n_3=1663*T_s$, and $n_4=185*T_s$. Note that in typical CQMF implementations there is a practical constraint that each delay is some integer multiple of the duration of a block of 64 samples (sample rate is typically 48K Hz), but in the time-domain there is more flexibility as to choice of each delay and thus more flexibility as to choice of the delay of each reverb tank);
- similar all-pass filter implementations (i.e., similar implementations of filter 301 of FIG. 4 and filter 401 of FIG. 9). For example, the all-pass filter can be implemented by cascading several (e.g., three) all-pass filters. For example, each cascaded all-pass filter may be of form $$\frac{g - Z^{-n_i}}{1 - g * Z^{-n_i}},$$

where g=0.6. All-pass filter 301 of FIG. 4 may be implemented by three cascaded all-pass filters with suitable delays of sample blocks (e.g., $n_1=64*T_s$, $n_2=128*T_s$, and $n_3=196*T_s$), whereas all-pass filter 401 of FIG. 9 (the time-domain all-pass filter) may be implemented by three cascaded all-pass filters with similar delays (e.g., $n_1=61*T_s$, $n_2=127*T_s$, and $n_3=191*T_s$).

Figure 9A:
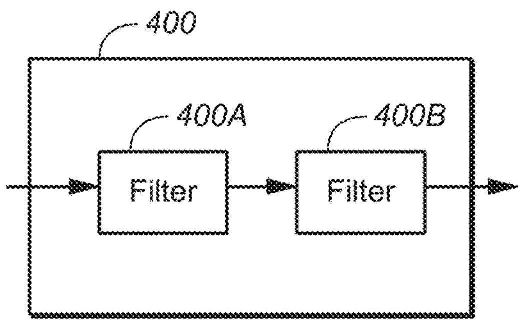
FIG. 9A is a block diagram of an example of an implementation of filter 400 of FIG. 9.

In some implementations of the time-domain FDN of FIG. 9, input filter 400 is implemented so that it causes the direct-to-late ratio (DLR) of the BRIR to be applied by the FIG. 9 system to match (at least substantially) a target DLR, and so that the DLR of the BRIR to be applied by a virtualizer including the FIG. 9 system (e.g., the FIG. 10 virtualizer) can be changed by replacing filter 400 (or controlling a configuration of filter 400). For example, in some embodiments, filter 400 is implemented as a cascade of filters (e.g., a first filter 400A and a second filter 400B, coupled as shown in FIG. 9A) to implement the target DLR and optionally also to implement desired DLR control. For example, the filters of the cascade are IIR filters (e.g., filter 400A is a first order Butterworth high pass filter (an IIR filter) configured to match the target low frequency characteristics, and filter 400B is a second order, low shelf IIR filter configured to match the target high frequency characteristics). For another example, the filters of the cascade are IIR and FIR filters (e.g., filter 400A is a second order Butterworth high pass filter (an IIR filter) configured to match the target low frequency characteristics, and filter 400B is a 14 order FIR filter configured to match the target high frequency characteristics). Typically, the direct signal is fixed, and filter 400 modifies the late signal to achieve the target DLR. All-pass filter (APF) 401 is preferably implemented to perform the same function as does APF 301 of FIG. 4, namely to introduce phase diversity and increased echo density to generate more natural sounding FDN output. APF 401 typically controls phase response while input filter 400 controls amplitude response.

In FIG. 9, filter 406 and gain element 406A together implement a reverb filter, filter 407 and gain element 407A together implement another reverb filter, filter 408 and gain element 408A together implement another reverb filter, and filter 409 and gain element 409A together implement another reverb filter. Each of filters 406, 407, 408, and 409 of FIG. 9 is preferably implemented as a filter with a maximal gain value close to one (unit gain), and each of gain elements 406A, 407A, 408A, and 409A is configured to apply a decay gain to the output of the corresponding one of filters 406, 407, 408, and 409 which matches the desired decay (after the relevant reverb tank delay, $n_i$). Specifically, gain element 406A is configured to apply a decay gain ($decaygain_1$) to the output of filter 406 to cause the output of element 406A to have a gain such that the output of delay line 410 (after the reverb tank delay, $n_1$) has a first target decayed gain, gain element 407A is configured to apply a decay gain ($decaygain_2$) to the output of filter 407 to cause the output of element 407A to have a gain such that the output of delay line 411 (after the reverb tank delay, $n_2$) has a second target decayed gain, gain element 408A is configured to apply a decay gain ($decaygain_3$) to the output of filter 408 to cause the output of element 408A to have a gain such that the output of delay line 412 (after the reverb tank delay, $n_3$) has a third target decayed gain, and gain element 409A is configured to apply a decay gain ($decaygain_4$) to the output of filter 409 to cause the output of element 409A to have a gain such that the output of delay line 413 (after the reverb tank delay, $n_4$) has a fourth target decayed gain.

Each of filters 406, 407, 408, and 409, and each of elements 406A, 407A, 408A, and 409A of the FIG. 9 system is preferably implemented (with each of filters 406, 407, 408, and 409 preferably implemented as an IIR filter, e.g., a shelf filter or a cascade of shelf filters) to achieve a target T60 characteristic of the BRIR to be applied by a virtualizer including the FIG. 9 system (e.g., the FIG. 10 virtualizer), where "T60" denotes reverb decay time ($T_{60}$). For example, in some embodiments each of filters 406, 407, 408, and 409 is implemented as a shelf filter (e.g., a shelf filter having Q=0.3 and a shelf frequency of 500 Hz, to achieve the T60 characteristic shown in FIG. 13, in which T60 has units of seconds) or as a cascade of two IIR shelf filters (e.g., having shelf frequencies 100 Hz and 1000 Hz, to achieve the T60 characteristic shown in FIG. 14, in which T60 has units of seconds). The shape of each shelf filter is determined so as to match the desired changing curve from low frequency to high frequency. When filter 406 is implemented as a shelf filter (or cascade of shelf filters), the reverb filter comprising filter 406 and gain element 406A is also a shelf filter (or cascade of shelf filters). In the same way, when each of filters 407, 408, and 409 is implemented as a shelf filter (or cascade of shelf filters), each reverb filter comprising filter 407 (or 408 or 409) and the corresponding gain element (407A, 408A, or 409A) is also a shelf filter (or cascade of shelf filters).

Figure 9B:
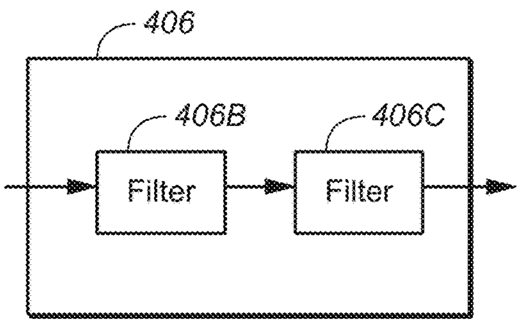
FIG. 9B is a block diagram of an example of an implementation of filter 406 of FIG. 9.

FIG. 9B is an example of filter 406 implemented as a cascade of a first shelf filter 406B and a second shelf filter 406C, coupled as shown in FIG. 9B. Each of filters 407,408, and 409 may be implement as is the FIG. 9B implementation of filter 406.

In some embodiments, the decay gains ($decaygain_i$) applied by elements 406A, 407A, 408A, and 409A are determined as follows:

$$decaygain_i = 10^{((-60*(ni/Fs)/T)/20)},$$

where i is the reverb tank index (i.e., element 406A applies $decaygain_i$, element 407A applies $decaygain_2$, and so on), ni is the delay of the ith reverb tank (e.g., n1 is the delay applied by delay line 410), Fs is the sampling rate, T is the desired reverb decay time ($T_{60}$) at a predetermined low frequency.

Figure 11:
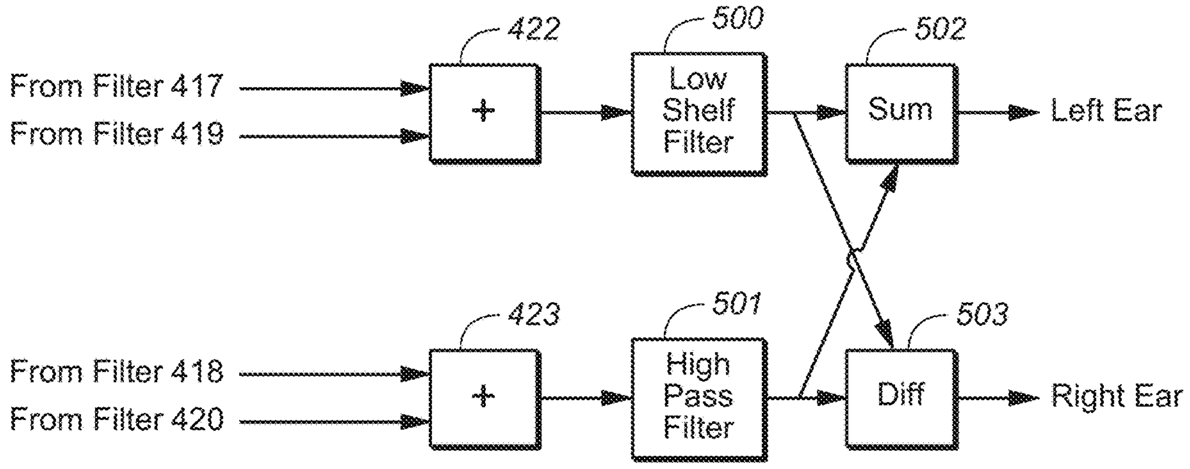
FIG. 11 is a block diagram of an embodiment of elements 422, 423, and 424 of the FDN of FIG. 9.

FIG. 11 is a block diagram of an embodiment of the following elements of FIG. 9: elements 422 and 423, and IACC (interaural cross-correlation coefficient) filtering and mixing stage 424. Element 422 is coupled and configured to sum the outputs of filters 417 and 419 (of FIG. 9) and to assert the summed signal to the input of low shelf filter 500, and element 422 is coupled and configured to sum the outputs of filters 418 and 420 (of FIG. 9) and to assert the summed signal to the input of high pass filter 501. The outputs of filters 500 and 501 are summed (mixed) in element 502 to generate the binaural left ear output signal, and the outputs of filters 500 and 501 are mixed in element 502 (the output of filter 500 is subtracted from the output of filter 501) in element 502 to generate the binaural right ear output signal. Elements 502 and 503 mix (sum and subtract) the filtered outputs of filters 500 and 501 to generate binaural output signals which achieve (to within acceptable accuracy) the target IACC characteristic. In the FIG. 11 embodiment, each of low shelf filter 500 and high pass filter 501 is typically implemented as a first order IIR filter. In an example in which filters 500 and 501 have such an implementation, the FIG. 11 embodiment may achieve the exemplary IACC characteristic plotted as curve "I" in FIG. 12, which is a good match to the target IACC characteristic plotted as "$I_T$" in FIG. 12.

Figure 11A:
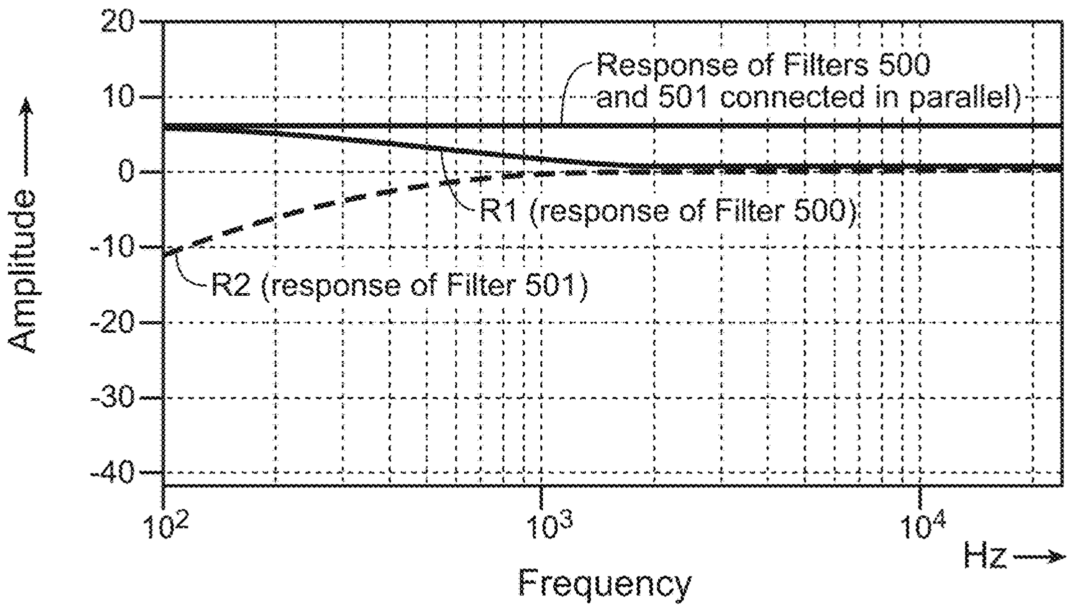
FIG. 11A is a graph of the frequency response (R1) of a typical implementation of filter 500 of FIG. 11, the frequency response (R2) of a typical implementation of filter 501 of FIG. 11, and the response of filters 500 and 501 connected in parallel.
Figure 12:
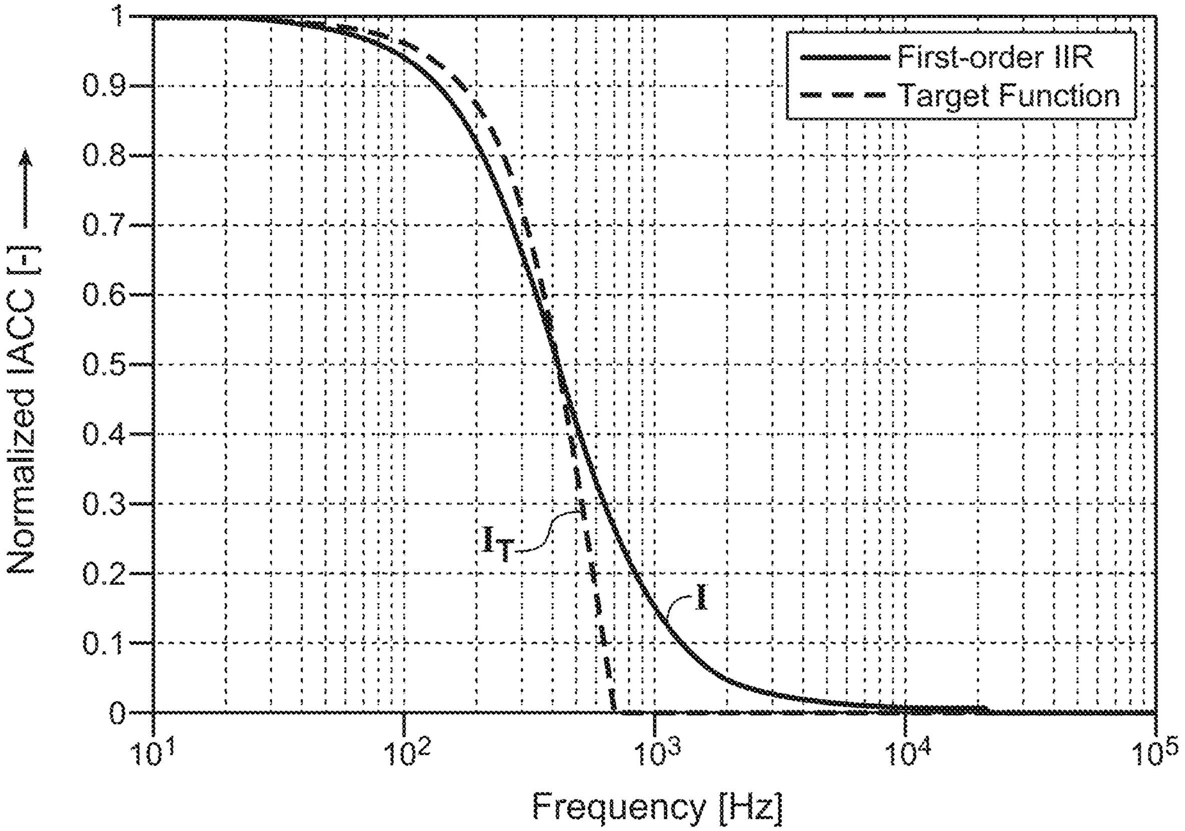
FIG. 12 is a graph of an example of an IACC characteristic (curve "I") which may be achieved by an implementation of the FDN of FIG. 9, and a target IACC characteristic (curve "$I_T$").
Figure 13:
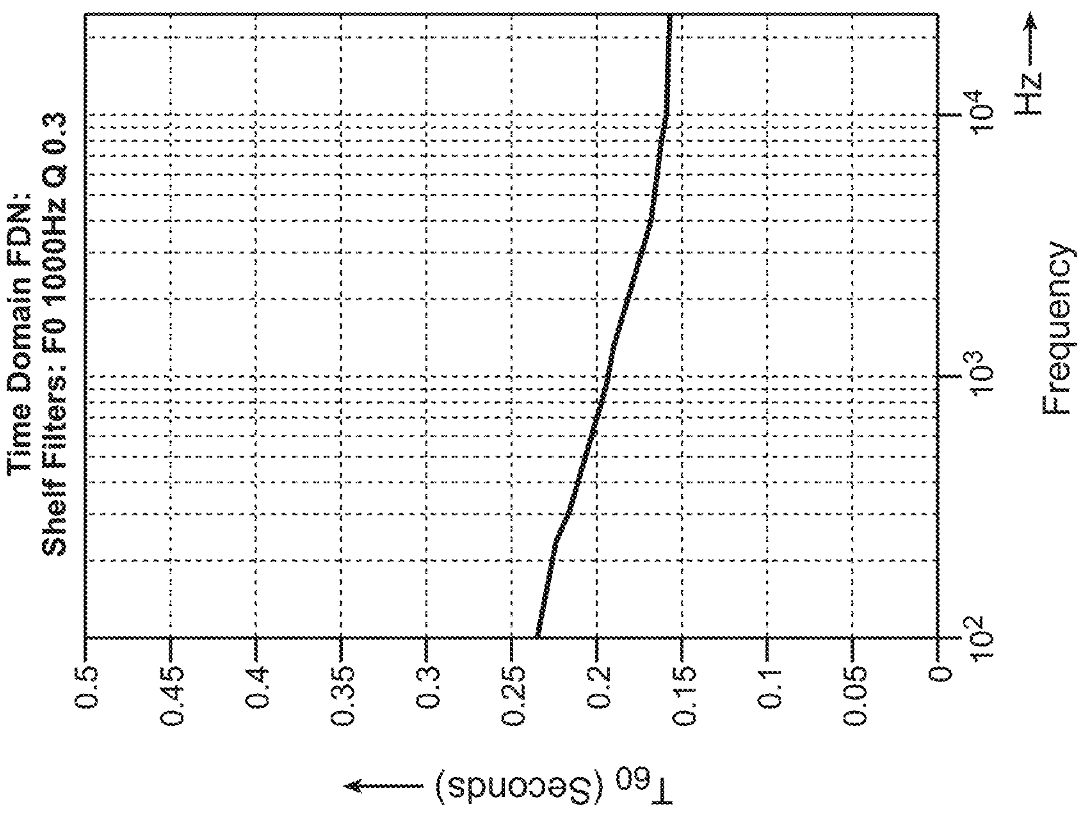
FIG. 13 is a graph of a T60 characteristic which may be achieved by an implementation of the FDN of FIG. 9, by appropriately implementing each of filters 406, 407, 408, and 409 is implemented as a shelf filter.
Figure 14:
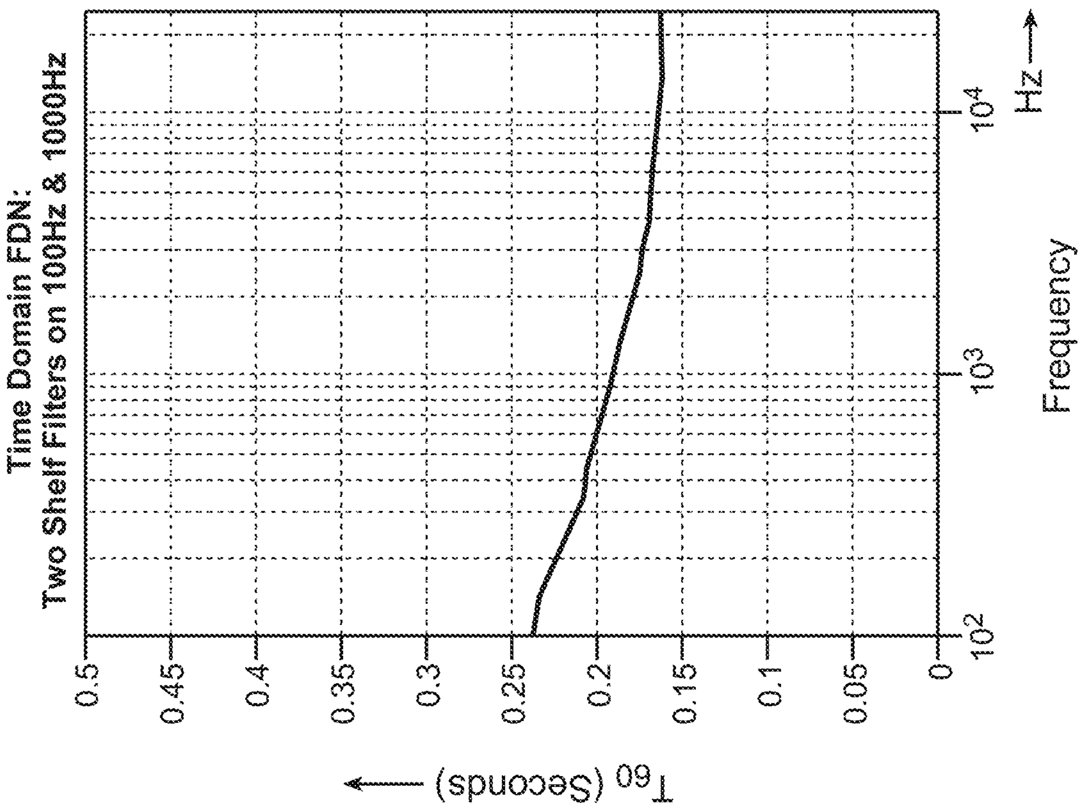
FIG. 14 is a graph of a T60 characteristic which may be achieved by an implementation of the FDN of FIG. 9, by appropriately implementing each of filters 406, 407, 408, and 409 is implemented as a cascade of two IIR shelf filters.

FIG. 11A is a graph of the frequency response (R1) of a typical implementation of filter 500 of FIG. 11, the frequency response (R2) of a typical implementation of filter 501 of FIG. 11, and the response of filters 500 and 501 connected in parallel. It is apparent from FIG. 11A, that the combined response is desirably flat across the range 100 Hz-10,000 Hz.

Thus, in a class of embodiments, the invention is a system (e.g., that of FIG. 10) and method for generating a binaural signal (e.g., the output of element 210 of FIG. 10) in response to a set of channels of a multi-channel audio input signal, including by applying a binaural room impulse response (BRIR) to each channel of the set, thereby generating filtered signals, including by using a single feedback delay network (FDN) to apply a common late reverberation to a downmix of the channels of the set; and combining the filtered signals to generate the binaural signal. The FDN is implemented in the time domain. In some such embodiments, the time-domain FDN (e.g., FDN 220 of FIG. 10, configured as in FIG. 9) includes:

an input filter (e.g., filter 400 of FIG. 9) having an input coupled to receive the downmix, wherein the input filter is configured to generate a first filtered downmix in response to the downmix;

an all-pass filter (e.g., all-pass filter 401 of FIG. 9), coupled and configured to a second filtered downmix in response to the first filtered downmix;

a reverb application subsystem (e.g., all elements of FIG. 9 other than elements 400, 401, and 424), having a first output (e.g., the output of element 422) and a second output (e.g., the output of element 423), wherein the reverb application subsystem comprises a set of reverb tanks, each of the reverb tanks having a different delay, and wherein the reverb application subsystem is coupled and configured to generate a first unmixed binaural channel and a second unmixed binaural channel in response to the second filtered downmix, to assert the first unmixed binaural channel at the first output, and to assert the second unmixed binaural channel at the second output; and an interaural cross-correlation coefficient (IACC) filtering and mixing stage (e.g., stage 424 of FIG. 9, which may be implemented as elements 500, 501, 502, and 503 of FIG. 11) coupled to the reverb application subsystem and configured to generate a first mixed binaural channel and a second mixed binaural channel in response to the first unmixed binaural channel and a second unmixed binaural channel.

The input filter may be implemented to generate (preferably as a cascade of two filters configured to generate) the first filtered downmix such that each BRIR has a direct-to-late ratio (DLR) which matches, at least substantially, a target DLR.

Each reverb tank may be configured to generate a delayed signal, and may include a reverb filter (e.g., implemented as a shelf filter or a cascade of shelf filters) coupled and configured to apply a gain to a signal propagating in said each of the reverb tanks, to cause the delayed signal to have a gain which matches, at least substantially, a target decayed gain for said delayed signal, in an effort to achieve a target reverb decay time characteristic (e.g., a $T_{60}$ characteristic) of each BRIR.

In some embodiments, the first unmixed binaural channel leads the second unmixed binaural channel, the reverb tanks include a first reverb tank (e.g., the reverb tank of FIG. 9 which includes delay line 410) configured to generate a first delayed signal having a shortest delay and a second reverb tank (e.g., the reverb tank of FIG. 9 which includes delay line 411) configured to generate a second delayed signal having a second-shortest delay, wherein the first reverb tank is configured to apply a first gain to the first delayed signal, the second reverb tank is configured to apply a second gain to the second delayed signal, the second gain is different than the first gain, the second gain is different than the first gain, and application of the first gain and the second gain results in attenuation of the first unmixed binaural channel relative to the second unmixed binaural channel. Typically, the first mixed binaural channel and the second mixed binaural channel are indicative of a re-centered stereo image. In some embodiments, the IACC filtering and mixing stage is configured to generate the first mixed binaural channel and the second mixed binaural channel such that said first mixed binaural channel and said second mixed binaural channel have an IACC characteristic which at least substantially matches a target IACC characteristic.

Aspects of the invention include methods and systems (e.g., system 20 of FIG. 2, or the system of FIG. 3, or FIG. 10) which perform (or are configured to perform, or support the performance of) binaural virtualization of audio signals (e.g., audio signals whose audio content consists of speaker channels, and/or object-based audio signals).

In some embodiments, the inventive virtualizer is or includes a general purpose processor coupled to receive or to generate input data indicative of a multi-channel audio input signal, and programmed with software (or firmware) and/or otherwise configured (e.g., in response to control data) to perform any of a variety of operations on the input data, including an embodiment of the inventive method. Such a general purpose processor would typically be coupled to an input device (e.g., a mouse and/or a keyboard), a memory, and a display device. For example, the FIG. 3 system (or system 20 of FIG. 2, or the virtualizer system comprising elements 12, . . . , 14, 15, 16, and 18 of system 20) could be implemented in a general purpose processor, with the inputs being audio data indicative of N channels of the audio input signal, and the outputs being audio data indicative of two channels of a binaural audio signal. A conventional digital-to-analog converter (DAC) could operate on the output data to generate analog versions of the binaural signal channels for reproduction by speakers (e.g., a pair of headphones).

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

The invention claimed is:

1. A method for generating a binaural signal in response to a set of channels of a multi-channel audio input signal, the method comprising:

applying a binaural room impulse response, BRIR, to each channel of the set, thereby generating filtered signals; and combining the filtered signals to generate the binaural signal, wherein applying the BRIR to each channel of the set comprises using a late reverberation generator to introduce, in response to control values asserted to the late reverberation generator, a common late reverberation into a downmix of the channels of the set, wherein the common late reverberation emulates collective macro attributes of late reverberation portions of single-channel BRIRs shared across at least some channels of the set, and wherein a content dependent energy equalization factor is applied to the downmix, and wherein a center channel of the multi-channel audio input signal is mixed to the left channel of the downmix with a coefficient of $$\frac{1}{\sqrt{2}},$$

and is also mixed to the right channel of the downmix with a coefficient of $$\frac{1}{\sqrt{2}}.$$

2. The method of claim 1, wherein applying a BRIR to each channel of the set comprises applying to each channel of the set a direct response and early reflection portion of the single-channel BRIR for the channel.

3. The method of claim 1, wherein the late reverberation generator comprises a bank of feedback delay networks to apply the common late reverberation to the downmix, with each feedback delay network of the bank applying late reverberation to a different frequency band of the downmix.

4. The method of claim 3, wherein each of the feedback delay networks is implemented in the complex quadrature mirror filter domain.

5. The method of claim 1, wherein the late reverberation generator comprises a single feedback delay network to apply the common late reverberation to the downmix of the channels of the set, wherein the feedback delay network is implemented in the time domain.

6. A system for generating a binaural signal in response to a set of channels of a multi-channel audio input signal, the system comprising one or more processors that:

apply a binaural room impulse response, BRIR, to each channel of the set, thereby generating filtered signals; and combine the filtered signals to generate the binaural signal, wherein applying the BRIR to each channel of the set comprises using a late reverberation generator to introduce, in response to control values asserted to the late reverberation generator, a common late reverberation into a downmix of the channels of the set, wherein the common late reverberation emulates collective macro attributes of late reverberation portions of single-channel BRIRs shared across at least some channels of the set, and wherein a content dependent energy equalization factor is applied to the downmix, and wherein a center channel of the multi-channel audio input signal is mixed to the left channel of the downmix with a coefficient of $$\frac{1}{\sqrt{2}},$$

and is also mixed to the right channel of the downmix with a coefficient of $$\frac{1}{\sqrt{2}}.$$

7. The system of claim 6, wherein applying a BRIR to each channel of the set comprises applying to each channel of the set a direct response and early reflection portion of the single-channel BRIR for the channel.

8. The system of claim 6, wherein the late reverberation generator includes a bank of feedback delay networks configured to apply the common late reverberation to the downmix, with each feedback delay network of the bank applying late reverberation to a different frequency band of the downmix.

9. The system of claim 8, wherein each of the feedback delay networks is implemented in the complex quadrature mirror filter domain.

10. The system of claim 6, wherein the late reverberation generator includes a feedback delay network implemented in the time domain, and the late reverberation generator is configured to process the downmix in the time domain in said feedback delay network to apply the common late reverberation to said downmix.

11. A non-transitory computer readable storage medium comprising a sequence of instructions, wherein, when an audio signal processing device executes the sequence of instructions, the audio signal processing device performs the method of claim 1.

* * * * *